US010386973B2

(12) United States Patent
Lee

(10) Patent No.: US 10,386,973 B2
(45) Date of Patent: Aug. 20, 2019

(54) DISPLAY DEVICE HAVING A GUARD LAYER CONFIGURED TO PREVENT INTERFERENCE OF SIGNALS BETWEEN A TOUCH SCREEN AND A SIGNAL LINE, AND METHOD OF MANUFACTURING THE SAME

(71) Applicant: G2TOUCH Co., LTD, Seongnam (KR)

(72) Inventor: Sung Ho Lee, Hwaseong (KR)

(73) Assignee: G2TOUCH CO., LTD., Seongnam (KR)

( * ) Notice: Subject to any disclaimer, the term of this patent is extended or adjusted under 35 U.S.C. 154(b) by 1 day.

(21) Appl. No.: 15/375,005

(22) Filed: Dec. 9, 2016

(65) Prior Publication Data
US 2017/0168612 A1   Jun. 15, 2017

(30) Foreign Application Priority Data

Dec. 11, 2015   (KR) .................. 10-2015-0176939

(51) Int. Cl.
*G06F 3/044*    (2006.01)
*G06F 3/041*    (2006.01)

(52) U.S. Cl.
CPC ............ *G06F 3/044* (2013.01); *G06F 3/0412* (2013.01); *G06F 2203/04103* (2013.01); *G06F 2203/04107* (2013.01); *G06F 2203/04111* (2013.01)

(58) Field of Classification Search
CPC .. G06F 3/0412; G06F 3/0416; G02F 1/13338; G02F 1/1309; G02F 1/134363
See application file for complete search history.

(56) References Cited

U.S. PATENT DOCUMENTS

| 2008/0309627 | A1* | 12/2008 | Hotelling | G02F 1/134363 345/173 |
| 2009/0096760 | A1* | 4/2009 | Ma | G02F 1/13338 345/174 |
| 2010/0149116 | A1* | 6/2010 | Yang | G06F 3/0416 345/173 |
| 2013/0335376 | A1* | 12/2013 | Lee | G06F 3/0416 345/174 |
| 2014/0062941 | A1* | 3/2014 | Park | G06F 3/0412 345/174 |
| 2014/0063363 | A1* | 3/2014 | Wang | G06F 3/0412 349/12 |
| 2014/0368749 | A1* | 12/2014 | Alonso | G02F 1/13338 349/12 |

(Continued)

FOREIGN PATENT DOCUMENTS

CN   103718143 A   4/2014
CN   105139775 A   12/2015
(Continued)

*Primary Examiner* — Jennifer Mehmood
*Assistant Examiner* — James S Nokham

(57) ABSTRACT

Disclosed herein are a display device having an embedded touch screen capable of preventing deterioration of image quality generated in the display device when a touch sensor and a sensor signal line are disposed in the display device and solving a problem that sensitivity of a detected touch signal is weakened due to a parasitic capacitance generated between the touch sensor and the sensor signal line and a driving signal line and components of the display device, and a method of manufacturing the same.

14 Claims, 19 Drawing Sheets

(56) References Cited

U.S. PATENT DOCUMENTS

2015/0241718 A1* 8/2015 Jeong .................. G02F 1/1309
349/143

FOREIGN PATENT DOCUMENTS

| KR | 10-2012-0055625 A | 5/2012 |
| KR | 10-2014-0062341 A | 5/2014 |
| KR | 10-2014-0121658 A | 10/2014 |
| KR | 10-2015-0063763 A | 6/2015 |
| KR | 10-2015-0120922 A | 10/2015 |

* cited by examiner

[FIG. 1]
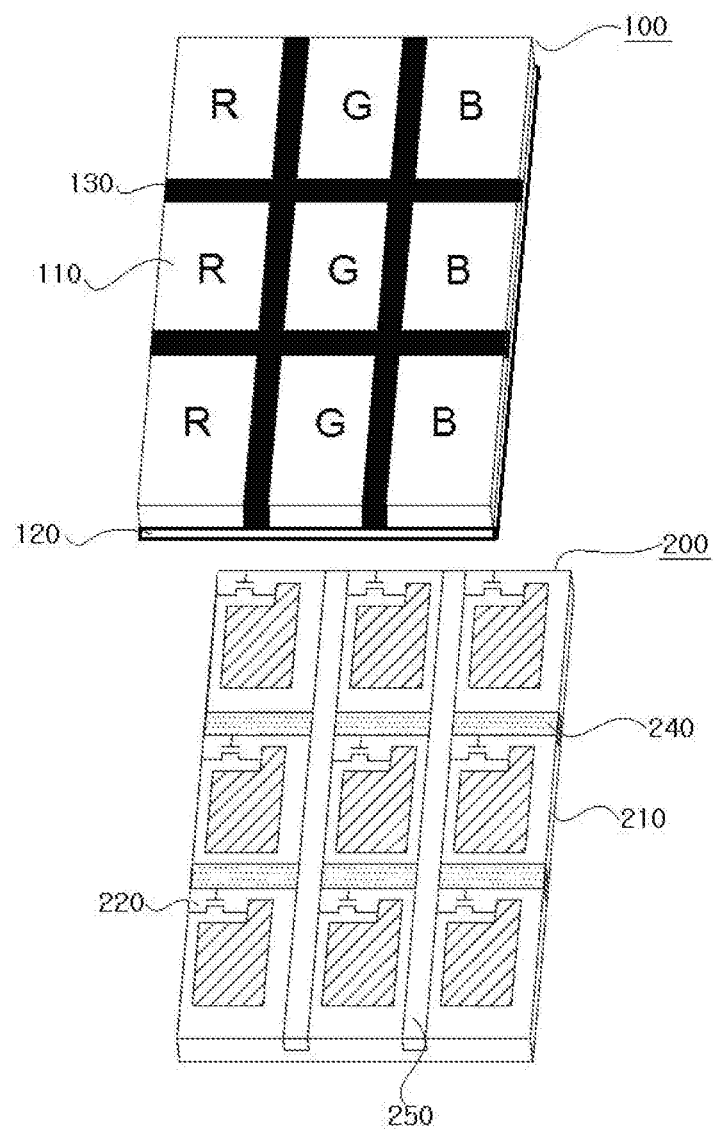

[FIG. 2]
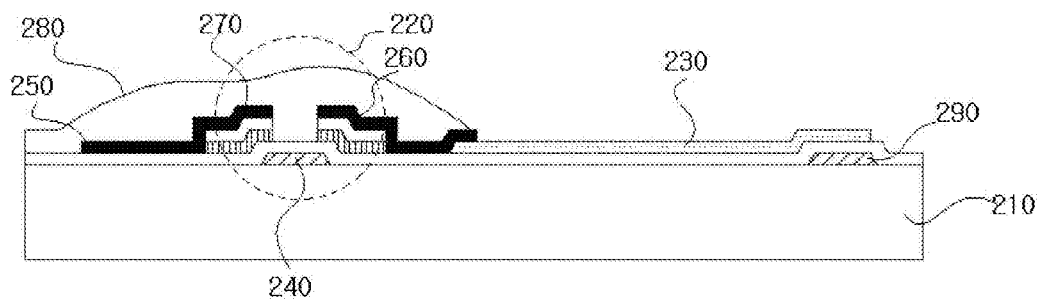
[FIG. 3]
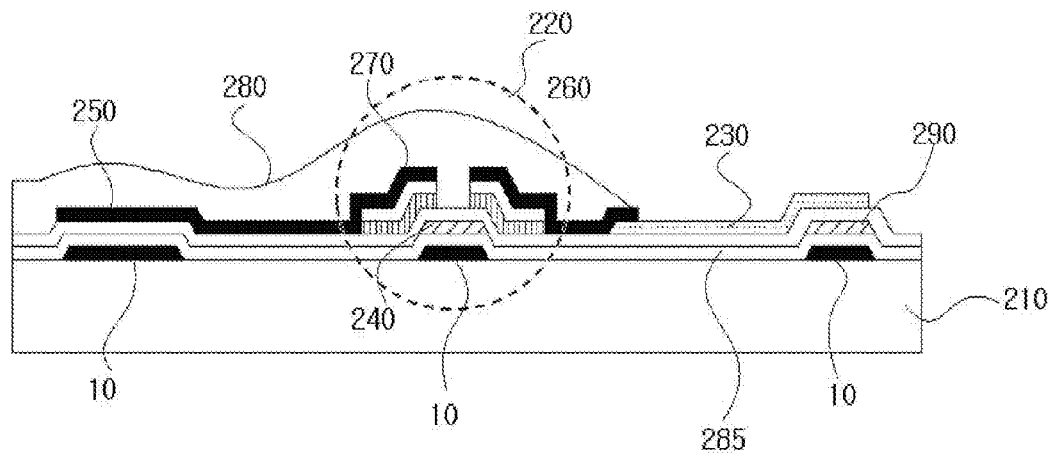

[FIG. 4]
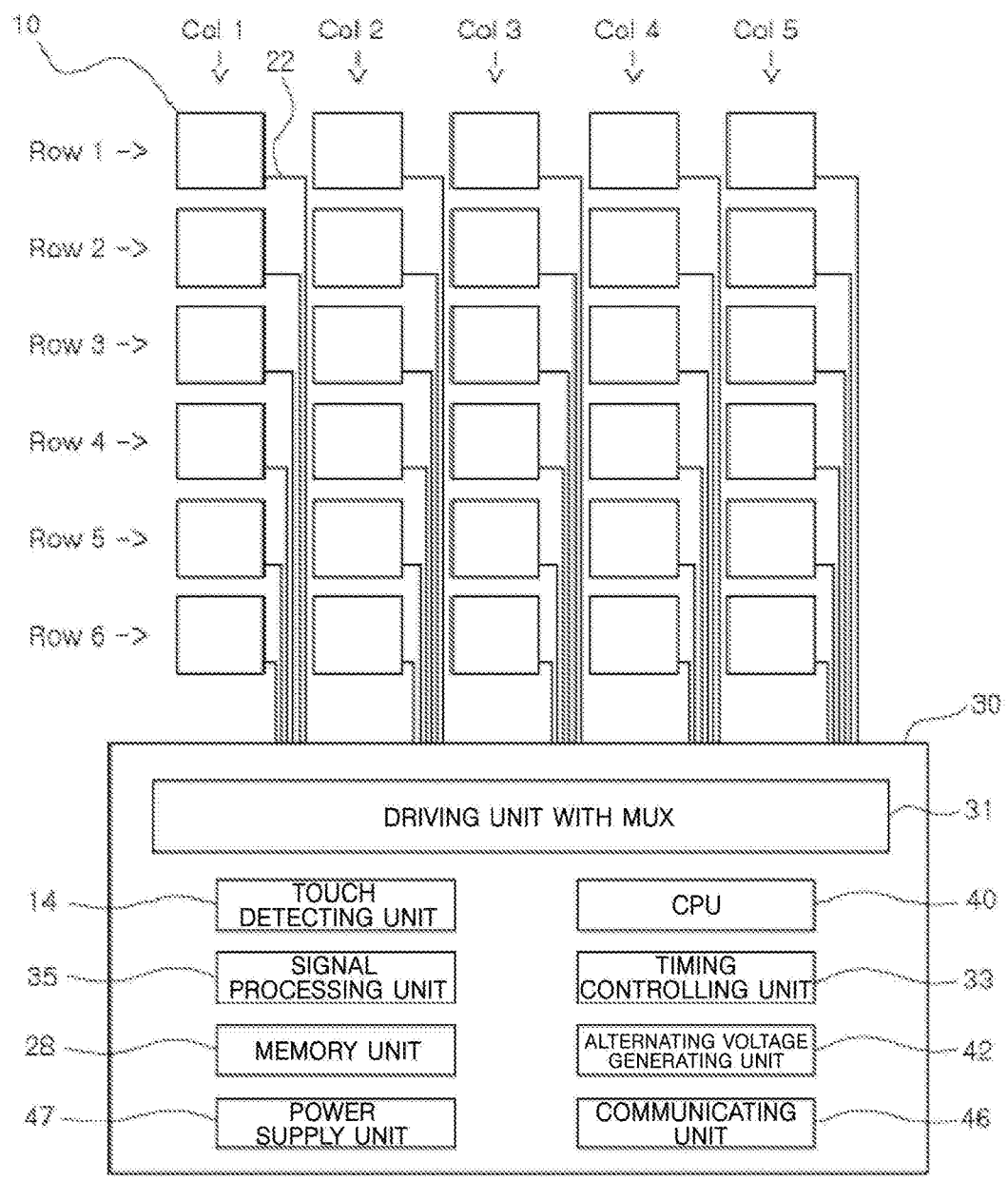

[FIG. 5]
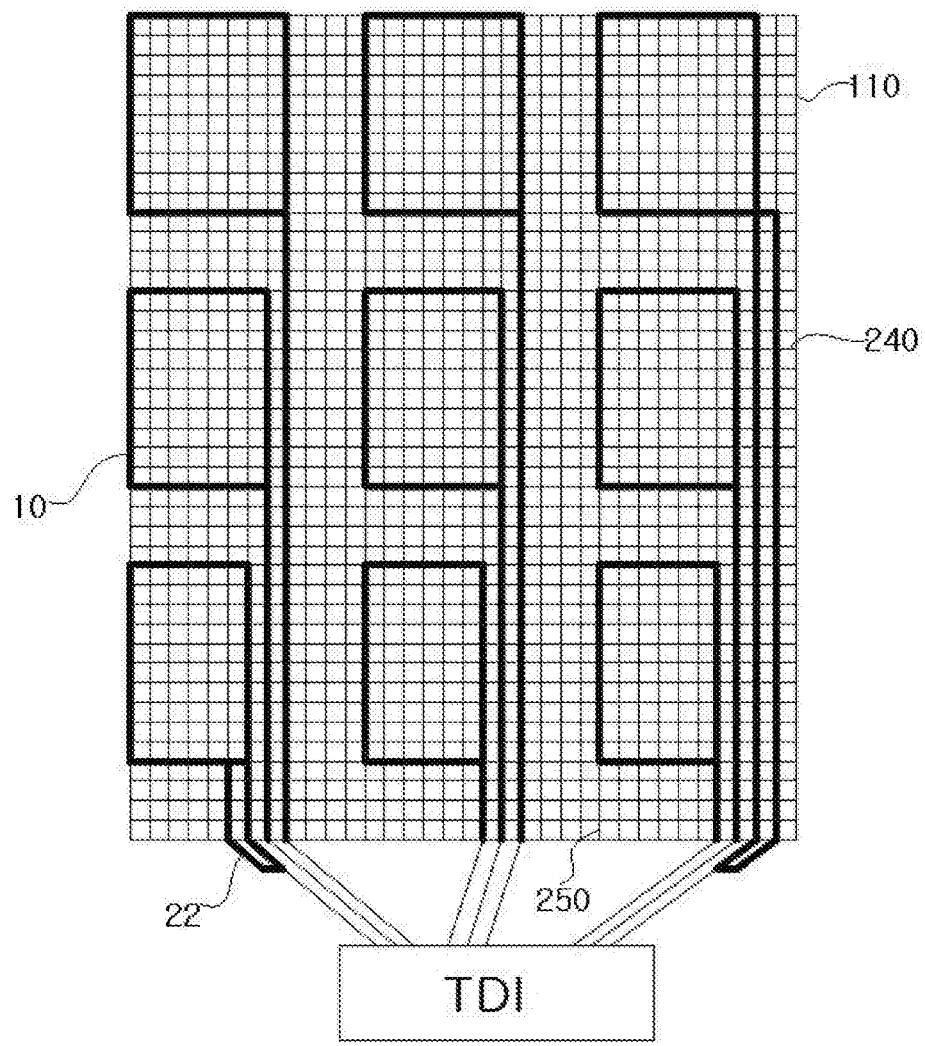

[FIG. 6]
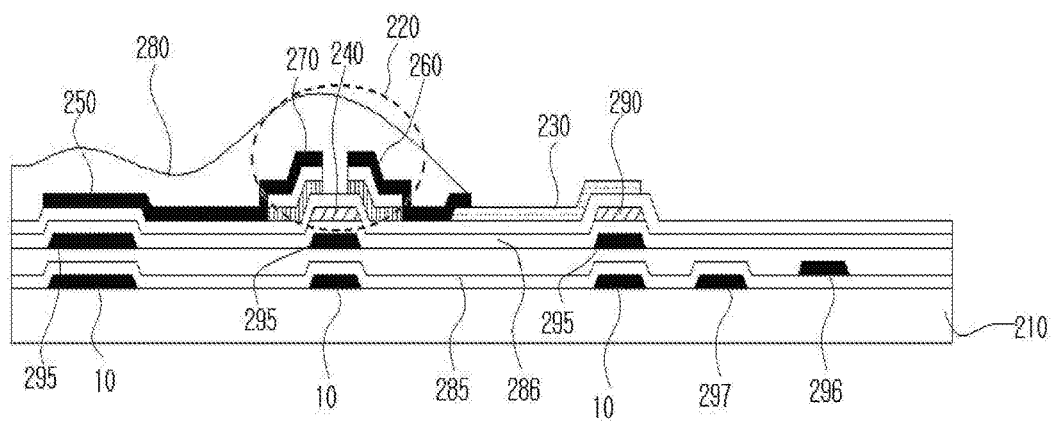
[FIG. 7]
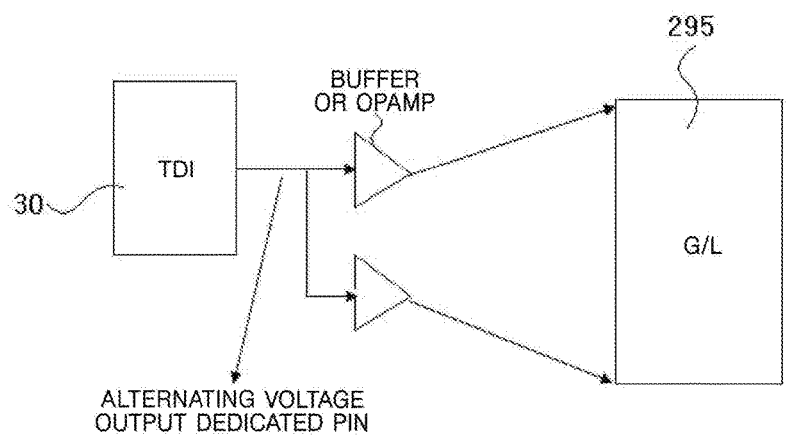

[FIG. 8]
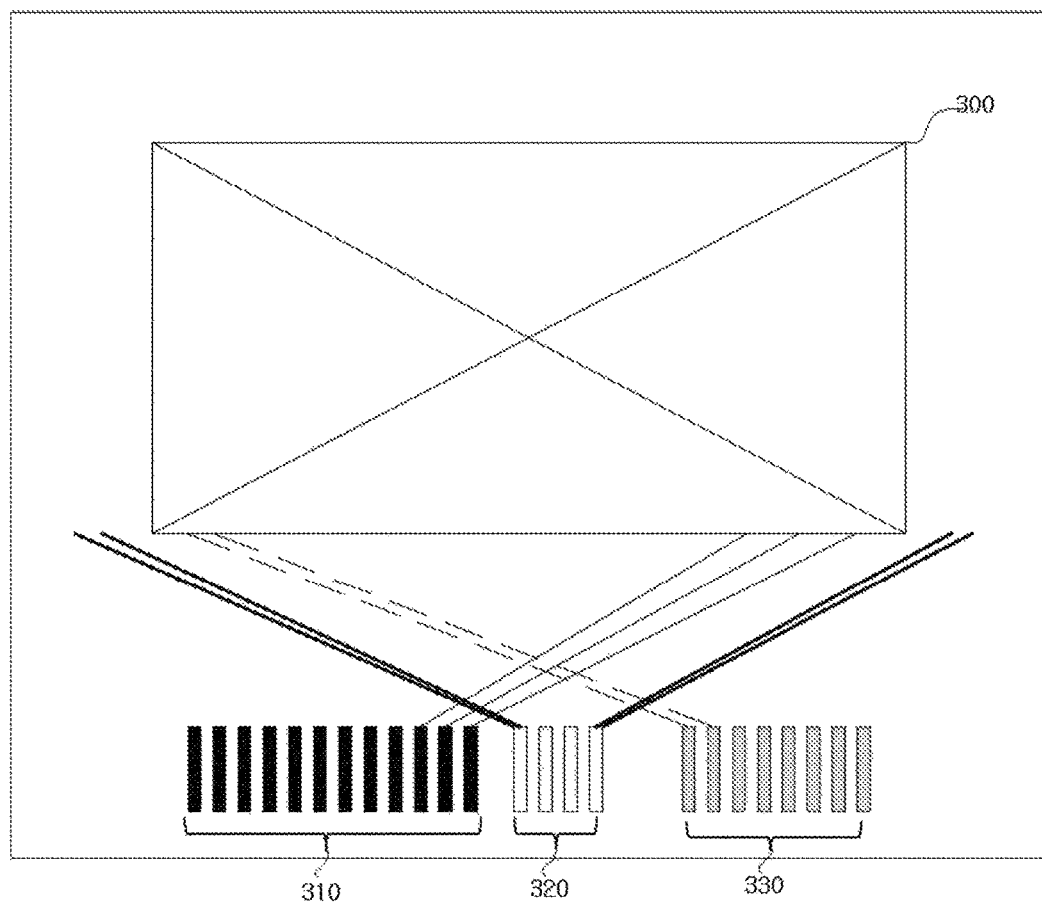

[FIG. 9]
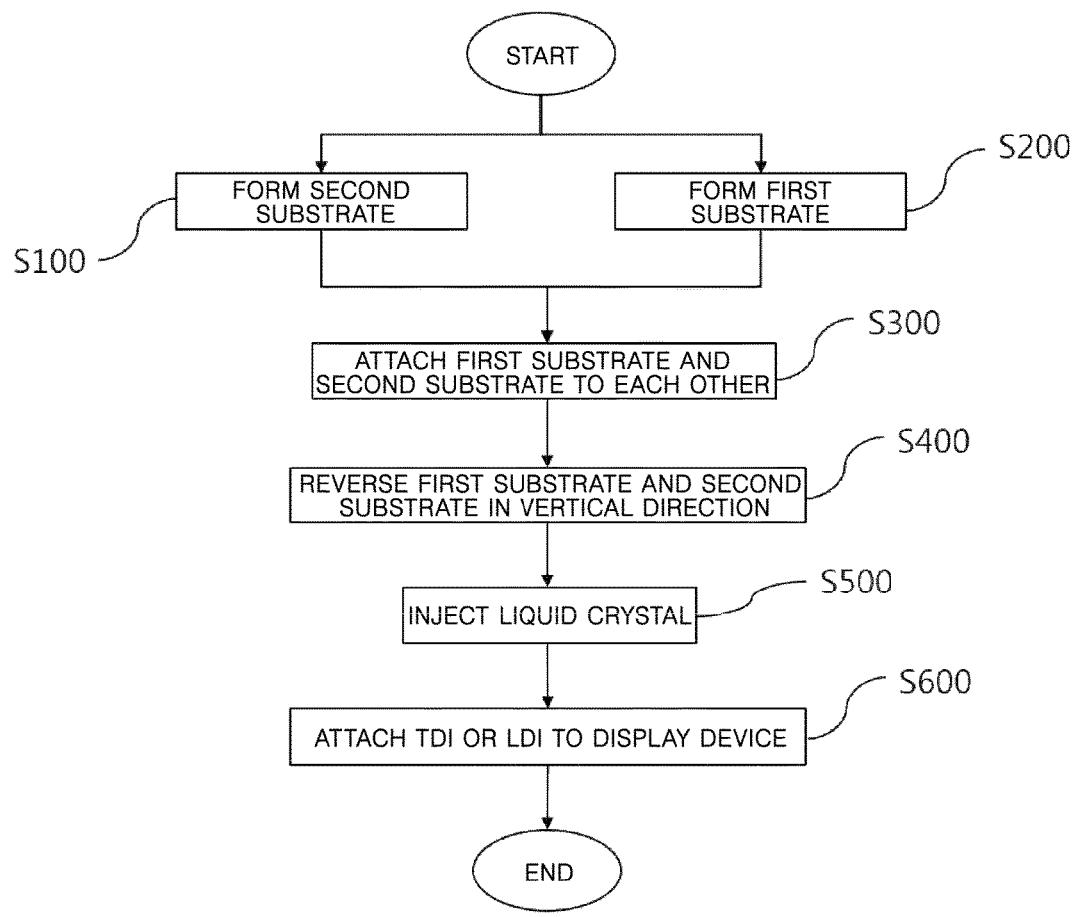

[FIG. 10]
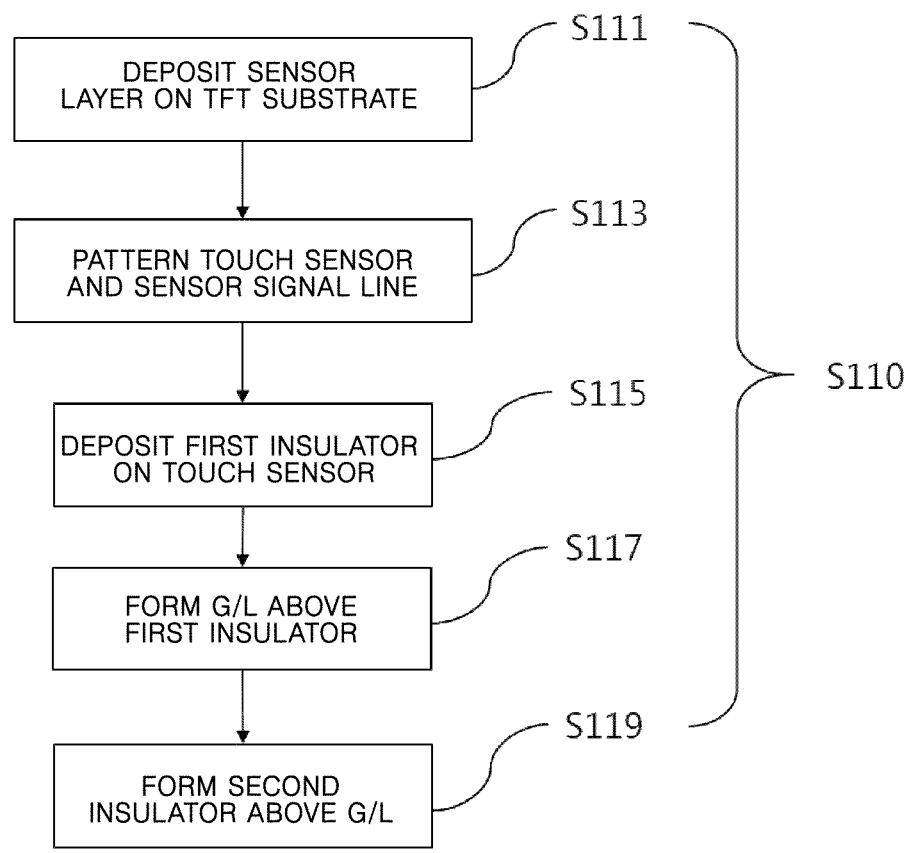

[FIG. 11]
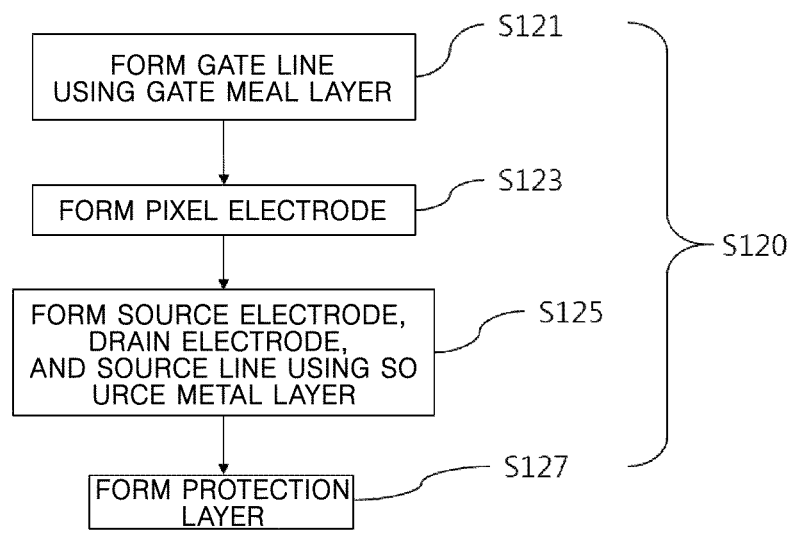

[FIG. 12]
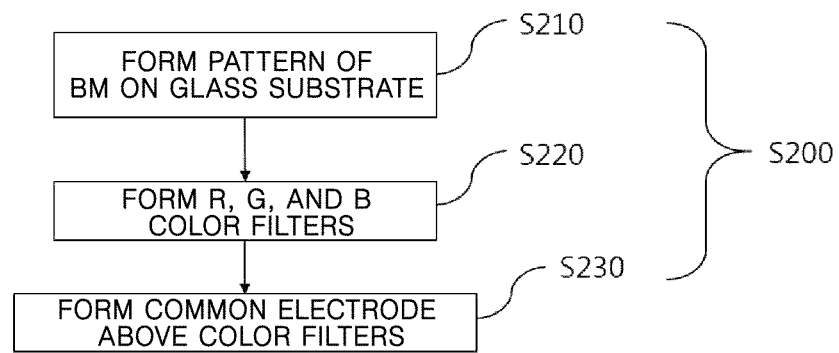

[FIG. 13]
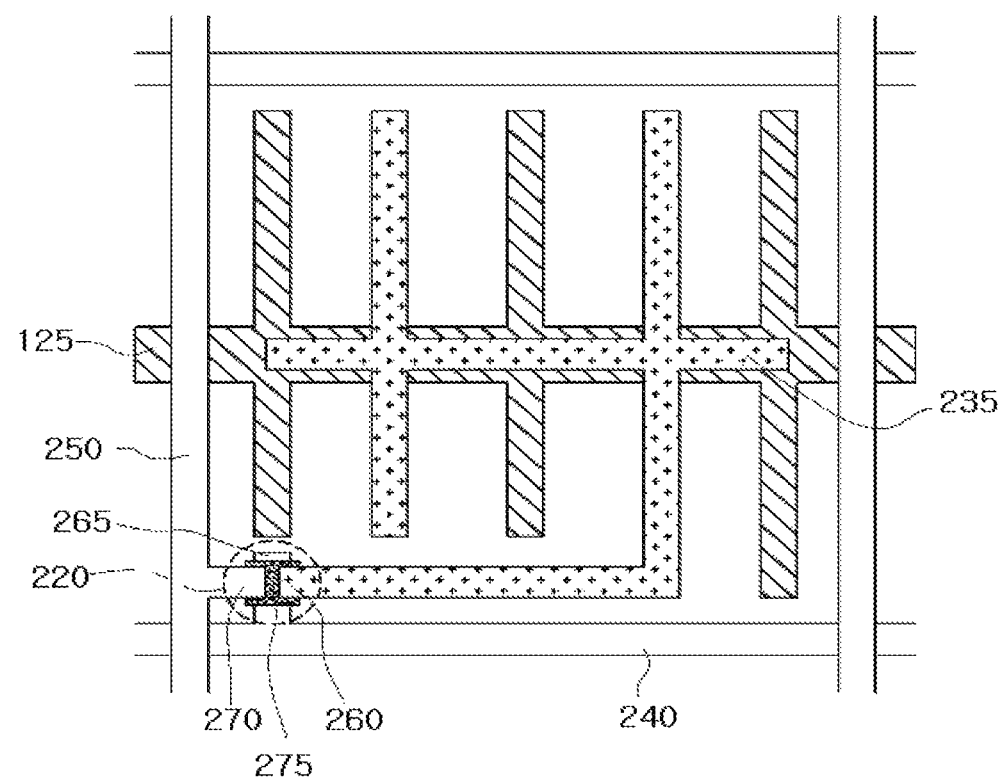

[FIG. 14]
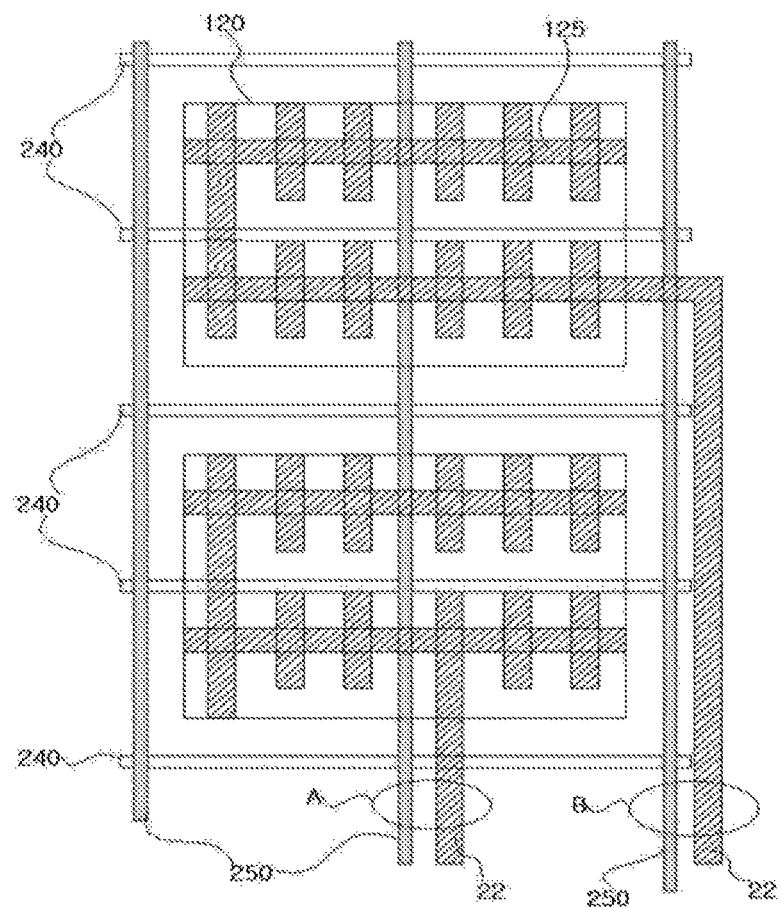

[FIG. 15]
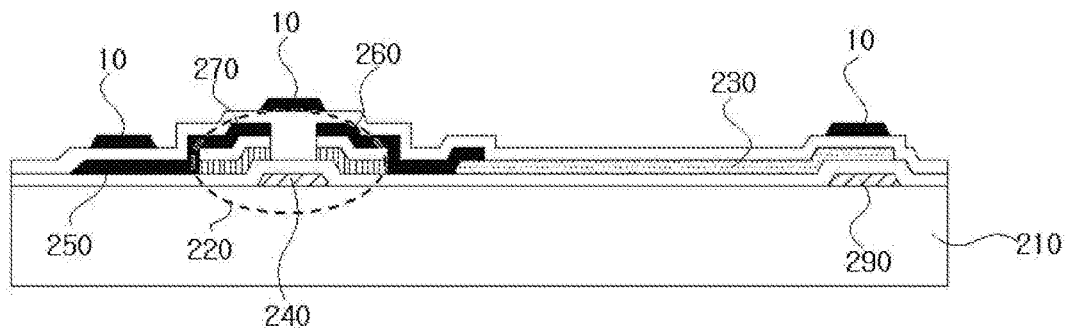
[FIG. 16]
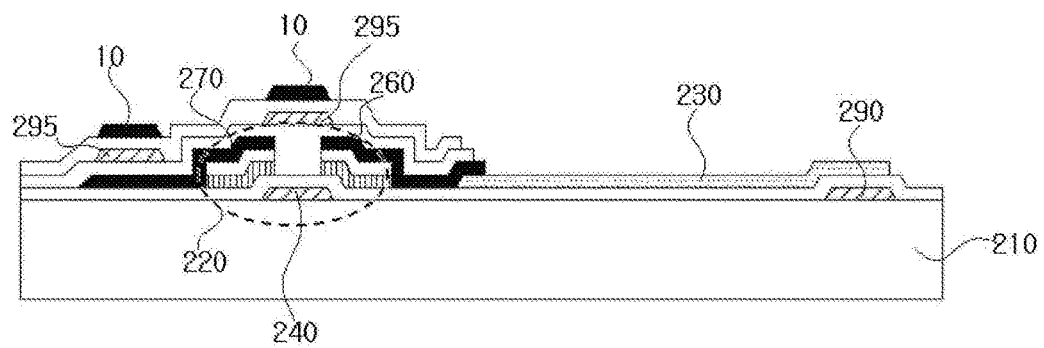

[FIG. 17]
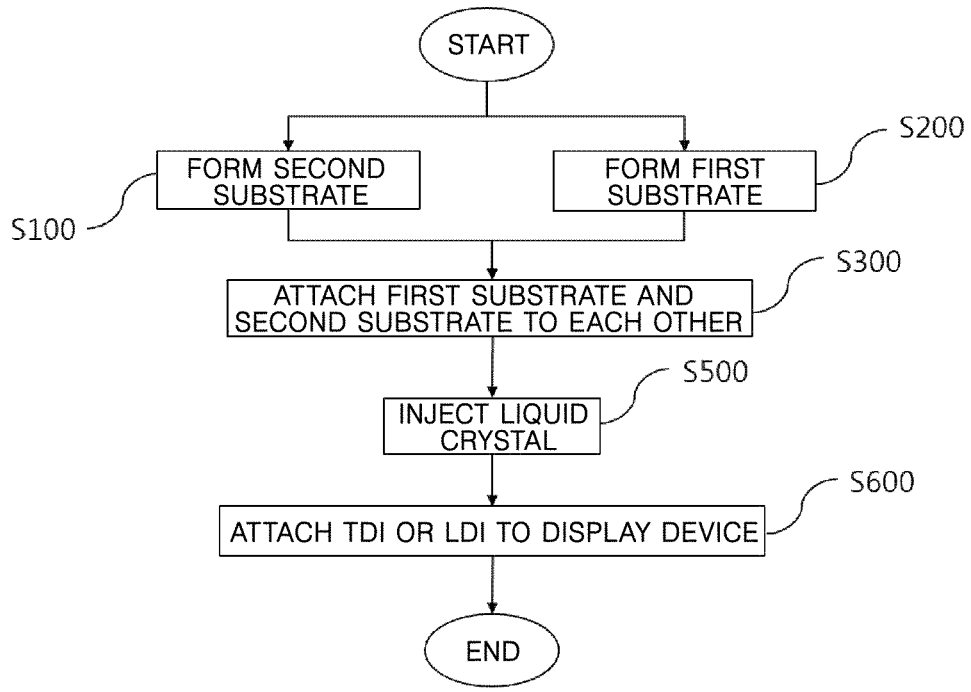
[FIG. 18]
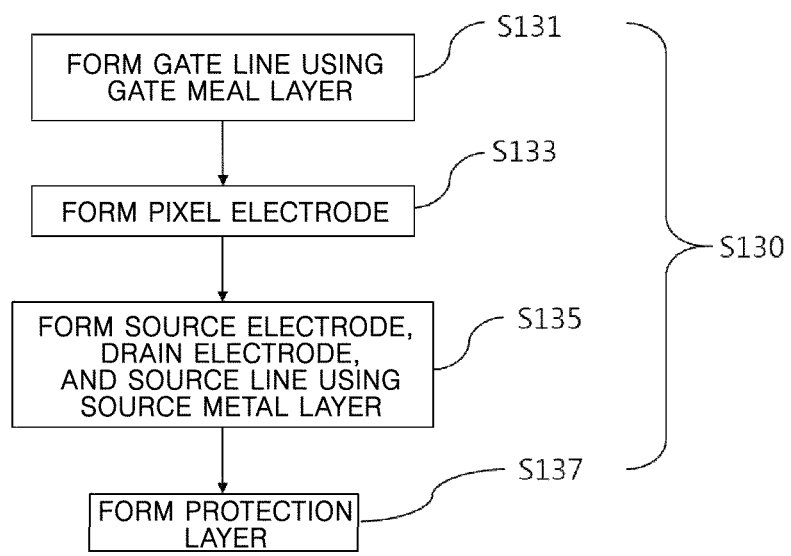

[FIG. 19]
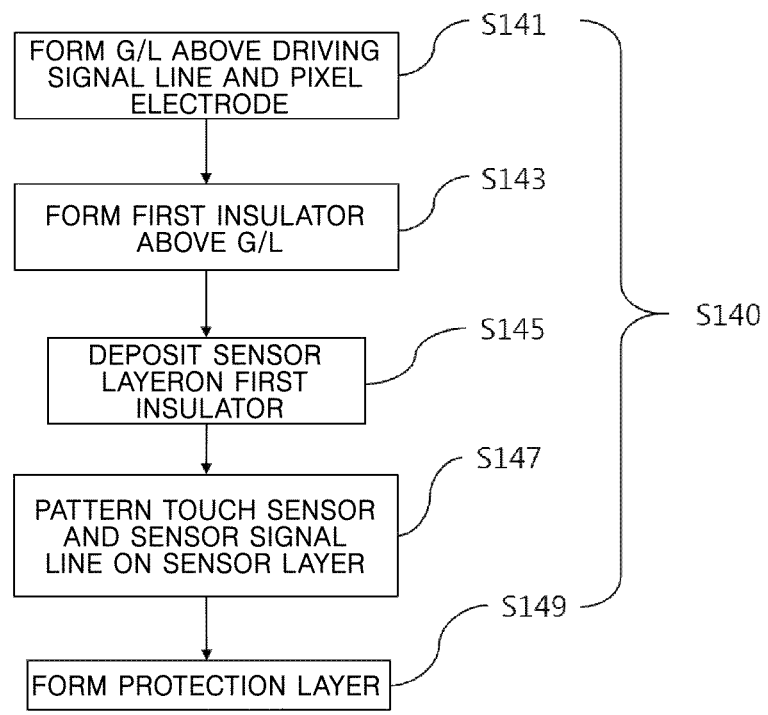

[FIG. 20]
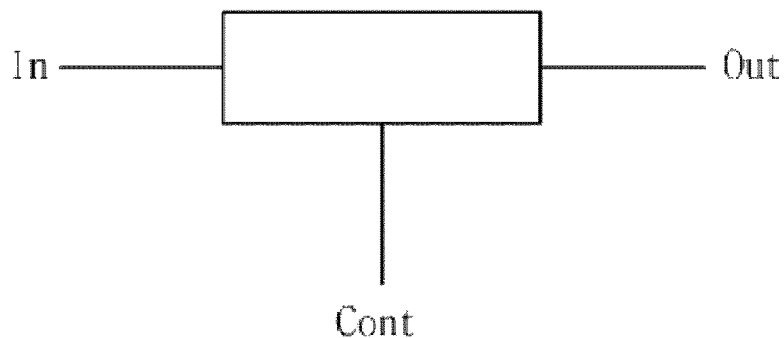
[FIG. 21]
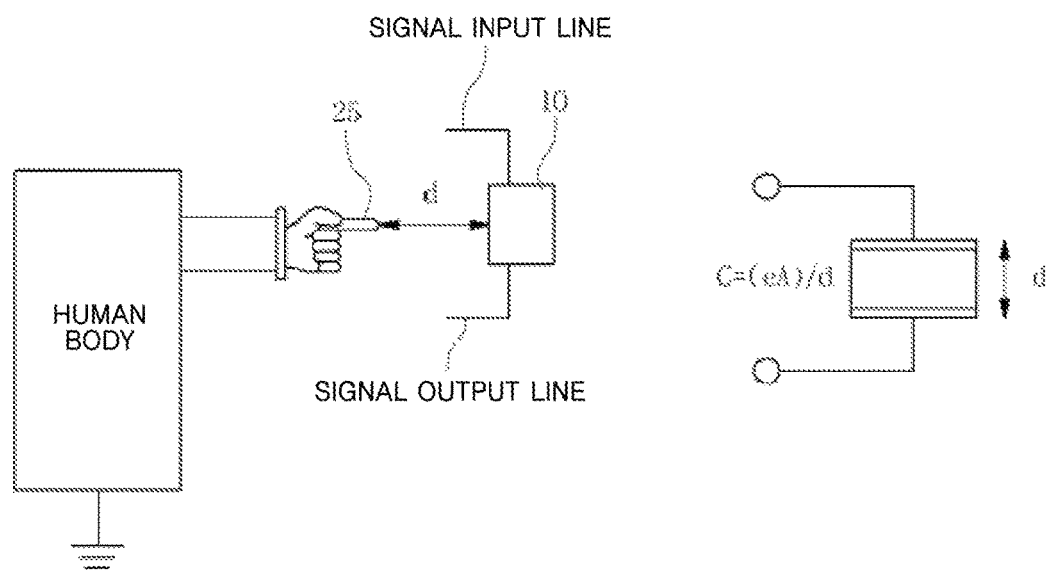

[FIG. 22]
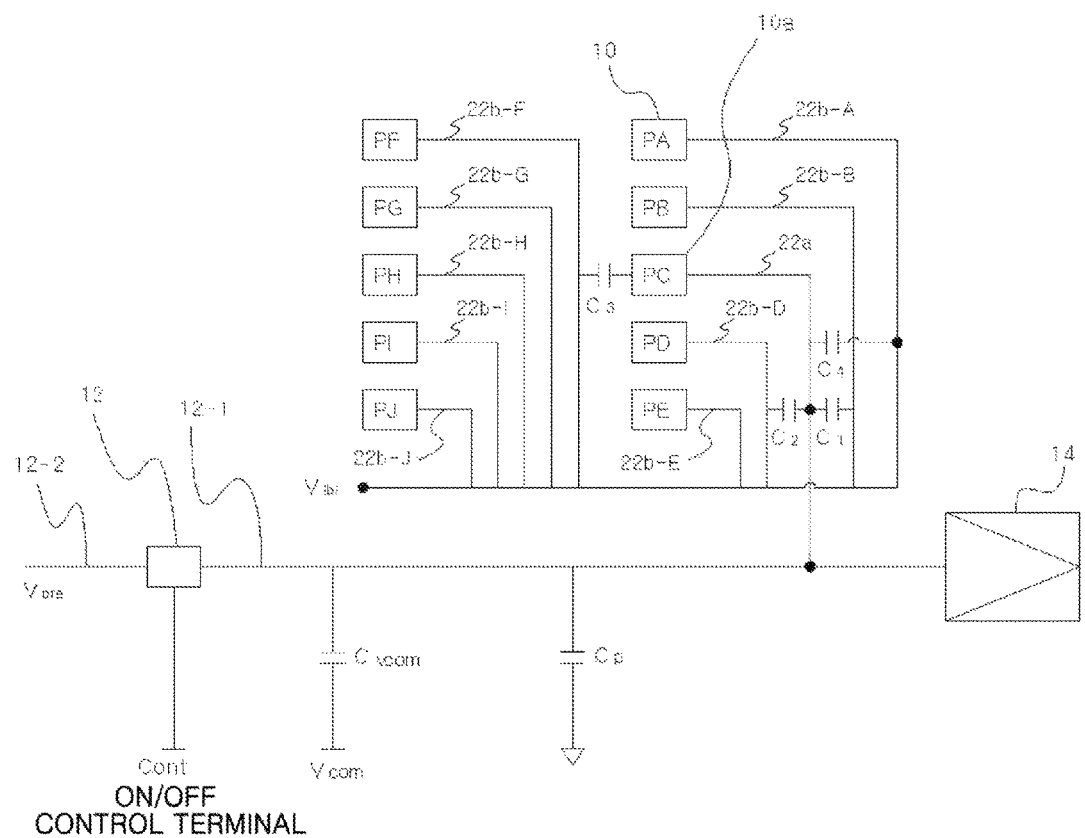

[FIG. 23]
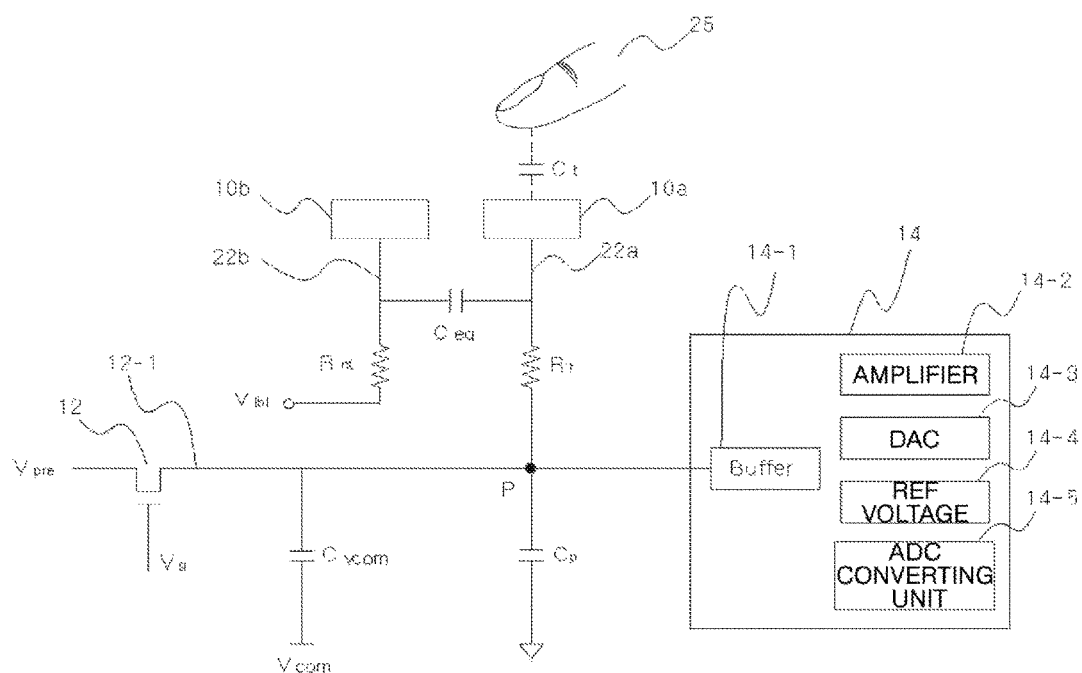

[FIG. 24]
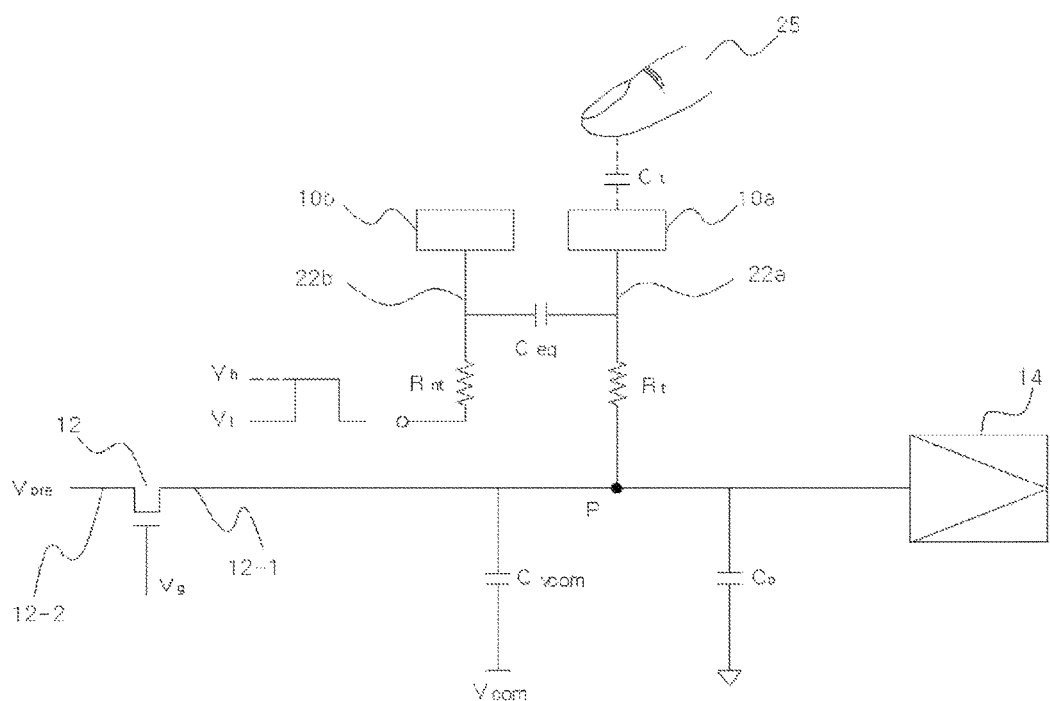

DISPLAY DEVICE HAVING A GUARD LAYER CONFIGURED TO PREVENT INTERFERENCE OF SIGNALS BETWEEN A TOUCH SCREEN AND A SIGNAL LINE, AND METHOD OF MANUFACTURING THE SAME

CROSS-REFERENCE TO RELATED APPLICATIONS

This application claims priority from and the benefit of Korean Patent Application No. 10-2015-0176939, filed on Dec. 11, 2015, which is hereby incorporated by reference for all purposes as if fully set forth herein.

BACKGROUND

Field

The present invention relates to a display device having an embedded touch screen including a touch screen panel, and more particularly, to a display device having an embedded touch screen capable of preventing deterioration of image quality generated in the display device when a touch sensor and a sensor signal line are disposed in the display device and solving a problem that sensitivity of a detected touch signal is weakened due to a parasitic capacitance generated between the touch sensor and the sensor signal line and a driving signal line and components of the display device, and a method of manufacturing the same.

Discussion of the Background

Generally, a touch screen, which is an input device added on display devices such as a liquid crystal display (LCD), a plasma display panel (PDP), an organic light emitting diode (OLED), an active matrix organic light emitting diode (AMOLED), and the like, or embedded in the display device, is a device recognizing an object such as a finger, a touch pen, or the like, contacting the touch screen as an input signal. A touch input device has been recently mounted mainly in mobile apparatuses such as a mobile phone, a personal digital assistants (PDA), a portable multimedia player (PMP), and the like, and has also been used in all industrial fields such as a navigation device, a netbook computer, a laptop computer, a digital information device (DID), a desktop computer using a touch input supporting operating system, an Internet protocol television (IPTV), a state-of-the-art fighter, a tank, an armored motorcar, and the like.

A display device in which the touch screen described above is used may be divided into a touch screen add-on type display device, a touch screen on-cell type display device, and a touch screen in-cell type display device depending on a structure thereof. The touch screen add-on type display device is manufactured by individually manufacturing a display device and a touch screen and then adding the touch screen on an upper plate of the display device, has a thick thickness, and has low brightness to have low visibility. The touch screen on-cell type display device is manufactured by directly forming elements constituting a touch screen on a surface of an upper substrate of a display device (a color filter of an LCD or a sealing substrate of an OLED), and may have a thickness reduced as compared with the touch screen add-on type display device, but may not be manufactured in an existing process of manufacturing an LCD, such that additional equipment investment is required or a manufacturing cost is increased at the time of manufacturing the touch screen on-cell type display device using an existing equipment.

On the other hand, the touch screen in-cell type display device may be manufactured in a process of manufacturing a display device such as an LCD, an OLED, or the like, such that a manufacturing cost is reduced, and a high performance display device manufacturing equipment may be used. Therefore, a yield is increased, such that the manufacturing cost is further reduced.

However, in the touch screen in-cell type display device according to the related art, touch sensors and sensor signal lines connected to the touch sensors generate interference with driving signal lines of the display device to cause deterioration of image quality of the display device, such that the touch sensors and the sensor signal lines are viewed, and in the case in which the sensor signal lines are disconnected, performance of the touch screen is deteriorated.

In addition, in the case in which the touch screen is embedded in the LCD, when pixel electrodes or source lines or gate lines of the LCD and the touch sensors or the sensor signal lines overlap with each other in a vertical or horizontal direction, a physical parasitic capacitance is generated, and a magnitude of the parasitic capacitance is significantly large, such that touch sensitivity is deteriorated or touch signals may not be detected in an extreme case, due to the parasitic capacitor.

RELATED ART DOCUMENT

Patent Document

Korean Patent Publication No. 10-1144723 (May 3, 2012)

BRIEF SUMMARY OF THE INVENTION

The present invention has been suggested in order to solve the problems in the related art as described above, and an object of the present invention is to form a touch sensor and a sensor signal line so as to be positioned above or below (or on the same line as) a driving signal line (a source line, a gate line, or the like) of a display device to prevent a signal line from being observed in the display device and remove an influence of the touch sensor and the sensor signal line on the display device, thereby preventing a malfunction of the display device.

Another object of the present invention is to install a guard layer (G/L) to which a driving signal that is the same as a driving signal applied to a touch sensor or has a predetermined rule is applied to reduce a parasitic capacitance generated between the touch sensor and a sensor signal line and components of a display device, thereby easily obtaining a touch signal.

Still another object of the present invention is to form a plurality of sensor signal lines with respect to the respective touch sensors to enable a touch signal to be detected by another sensor signal line even though disconnection is generated in any sensor signal line, thereby improving a yield of a product.

Yet still another object of the present invention is to use a sensor signal line together with a source metal and a gate metal used in a display device in an area except for an active area (A/A) in which a screen of the display device is displayed, thereby reducing a resistance of the sensor signal line.

According to an exemplary embodiment of the present invention, there is provided a display device in which a first substrate on which a color filter and a common electrode are formed and a second substrate on which a pixel electrode and a driving signal line are formed are disposed to overlap with each other, wherein a sensor layer including a touch sensor sensing a touch signal and a sensor signal line is formed below the driving signal line.

According to another exemplary embodiment of the present invention, there is provided a display device in which a first substrate on which a color filter is formed and a second substrate on which a pixel electrode and a driving signal line are formed are disposed to overlap with each other, wherein a sensor layer including a touch sensor sensing a touch signal and a sensor signal line is formed above the driving signal line.

According to still another exemplary embodiment of the present invention, there is provided a method of manufacturing a display device in which a first substrate on which a color filter and a common electrode are formed and a second substrate on which a pixel electrode and a driving signal line are formed are disposed to overlap with each other, including: forming a sensor layer on a thin film transistor (TFT) substrate; and forming the driving signal line and the pixel electrode above the sensor layer, wherein the forming of the sensor layer includes forming an isolated touch sensor and a sensor signal line connecting the touch sensor and a touch drive integrated circuit (TDI) to each other on the sensor layer.

According to yet still another exemplary embodiment of the present invention, there is provided a method of manufacturing a display device in which a first substrate on which a color filter is formed and a second substrate on which a pixel electrode and a driving signal line are formed are disposed to overlap with each other, including: forming the driving signal line and the pixel electrode on a TFT substrate; and forming a sensor layer above the driving signal line and the pixel electrode, wherein the forming of the sensor layer includes forming an isolated touch sensor and a sensor signal line connecting the touch sensor and a TDI to each other on the sensor layer.

BRIEF DESCRIPTION OF THE DRAWINGS

FIG. 1 is a view illustrating a structure of an LCD.

FIG. 2 is a view illustrating a detailed structure of a thin film transistor (TFT) of FIG. 1.

FIG. 3 is a view illustrating a structure of a TFT in a display device having an embedded touch screen according to an exemplary embodiment of the present invention.

FIG. 4 is a view illustrating an example of a layout of touch sensors and a touch integrated circuit (IC) in the display device having an embedded touch screen according to an exemplary embodiment of the present invention.

FIG. 5 is a view illustrating a configuration of touch sensors in the display device having an embedded touch screen according to an exemplary embodiment of the present invention.

FIGS. 6 and 7 are views illustrating the use of a guard layer (G/L) and a transfer of a driving signal according to an exemplary embodiment of the present invention.

FIG. 8 is a view for describing a method of applying required signals to a display device, a touch sensor, and a G/L in the display device having an embedded touch screen according to an exemplary embodiment of the present invention.

FIG. 9 is an entire flow chart of a method of manufacturing a display device having an embedded touch screen according to an exemplary embodiment of the present invention.

FIG. 10 is a detailed flow chart of S110 in the method of manufacturing a display device having an embedded touch screen according to an exemplary embodiment of the present invention.

FIG. 11 is a detailed flow chart of S120 in the method of manufacturing a display device having an embedded touch screen according to an exemplary embodiment of the present invention.

FIG. 12 is a detailed flow chart of S200 in the method of manufacturing a display device having an embedded touch screen according to an exemplary embodiment of the present invention.

FIG. 13 is a view illustrating a configuration of a TFT substrate among components of an LCD using a transversal electric field mode.

FIG. 14 is a view illustrating an example of a display device having an embedded touch screen according to an exemplary embodiment of the present invention using a Vcom electrode in a transversal electric field mode.

FIG. 15 is a view illustrating an example in which a touch sensor 10 is positioned on an upper surface of a gate line 240 or a source line 250.

FIG. 16 is a view illustrating a method of installing a G/L between a touch sensor and a signal line when the touch sensor is positioned on an upper surface of the signal line according to an exemplary embodiment of the present invention.

FIG. 17 is an entire flow chart of a method of manufacturing a display device having an embedded touch screen according to another exemplary embodiment of the present invention.

FIG. 18 is a detailed flow chart of S130 in the method of manufacturing a display device having an embedded touch screen according to another exemplary embodiment of the present invention.

FIG. 19 is a detailed flow chart of S140 in the method of manufacturing a display device having an embedded touch screen according to another exemplary embodiment of the present invention.

FIG. 20 is a conceptual diagram of a three-terminal switching element according to an exemplary embodiment of the present invention.

FIG. 21 is a view for describing a principle in which a touch capacitance and a capacitance between lines are formed.

FIG. 22 is a circuit diagram illustrating a basic structure of a touch detecting means in the display device having an embedded touch screen according to an exemplary embodiment of the present invention.

FIG. 23 is an equivalent circuit diagram of FIG. 22.

FIG. 24 is a view illustrating an example in which a touch sensor according to an exemplary embodiment of the present invention applies an alternating voltage to an equivalent capacitor Ceq between lines in order to detect a touch signal.

DETAILED DESCRIPTION OF THE ILLUSTRATED EMBODIMENTS

Hereinafter, exemplary embodiments of the present invention will be described in detail with reference to the accompanying drawings.

First, the present invention relates to a display device having an embedded touch screen including a touch screen panel and a method of manufacturing the same, and more particularly, to a method of detecting a touch by applying a driving voltage to a driving capacitor (Cdrv) in a touch integrated circuit (IC) when a capacitance by a touch of a finger, or the like, is applied to a sensing pad (a pad connected to a touch detecting unit) or detecting a touch using a phenomenon that a difference in a detection voltage due to a magnitude difference in a capacitance caused by the touch is generated when an alternating driving voltage is applied to a sensing equivalent capacitor formed between the sensing pad (the pad connected to the touch detecting unit) that is detecting the touch and a non-sensing pad (a pad that corresponds to the sensing pad and is not connected to the touch detecting unit) adjacent to the sensing pad, and a touch structure in a display device enabling the detection of the touch.

In the method of detecting a touch according to an exemplary embodiment of the present invention, magnitudes of a voltage detected when a touch is not generated and a voltage detected when a touch capacitance is applied by generation of a touch are compared with each other, the touch is detected by a difference between the magnitudes of these two voltages, and an influence by a parasitic capacitance, or the like, is minimized by a guard layer (G/L), thereby making it possible to more stably obtain a touch signal.

A display device stated in the present invention is any one of a kind of liquid crystal display (LCD), a plasma display panel (PDP), an active matrix organic light emitting diode (AMOLED), and a passive matrix organic light emitting diode (PMOLED), or includes all means displaying any type of still image (such as JPG, TIF, or the like) or moving picture (MPEG-2, MPEG-4, or the like) to users.

A touch input means in the present invention includes any type of input (for example, an object such as a conductor having a predetermined form or an input such as an electromagnetic wave, or the like) generating a voltage change that may be sensed by a touch sensor, as well as a keyboard, a mouse, a finger, a touch pen, and a stylus pen.

In addition, in the present disclosure, a phrase "on the same line" is used as the meaning that two components overlap with each other at the same position in a vertical direction, and a metal material, an insulator, or the like, forming a signal line may be present between the two components. For example, when A and B are positioned on the same line, it means that A is positioned on an upper surface of B or B is positioned on an upper surface of A, and another material such as an insulator, a metal, or the like, may be present between A and B.

In addition, when A and B are positioned on the same line, a width of A and a width of B are not limited unless separately mentioned, and a ratio between the widths of A and B is not specified unless separately mentioned. However, in the present disclosure, it is considered that the width of A and the width of B are the same as each other by way of example.

In addition, components such as ~units to be described below are assemblies of unit function elements performing specific functions. For example, an amplifier of a certain signal is a unit function element, and an assembly in which the amplifier and signal converters are collected may be called a signal converting unit. In addition, a ~unit may be included in a larger component or ~unit or may include smaller components and ~units. In addition, a ~unit may include an individual central processing unit (CPU) that may process calculation functions or commands, or the like, stored in a memory, or the like.

In the following drawings, thicknesses or areas are exaggerated in order to clearly represent several layers and areas. Throughout the present disclosure, similar components will be denoted by like reference numerals. When a portion such as a layer, an area, a substrate, or the like, is referred to as being positioned on an upper portion of another portion, a portion may be directly positioned on another portion (the other portion is not present therebetween) or the other portion (for example, a medium layer or an insulating layer) may be present therebetween.

In addition, a signal stated in the present disclosure generally indicates a voltage or a current unless specifically mentioned.

In addition, in the present disclosure, a capacitance indicates a physical magnitude. Meanwhile, a capacitor indicates an element having a capacitance, which is a physical magnitude. In the present invention, a compensation capacitor (Cba1) is formed in a touch drive IC by a design and manufacturing process or is naturally formed between adjacent two sensor signal lines. In the present disclosure, both of the directly formed capacitor and the naturally formed capacitor will be called a capacitor without being distinguished from each other.

In the present disclosure, C used as a sign of a capacitor is used as a sign indicating the capacitor, and also indicates a capacitance, which is a magnitude of the capacitor. For example, C1 is not only a sign indicating a capacitor, but also indicates a capacitance of the capacitor.

In addition, in the present disclosure a phrase "applying a signal" means that a level of a signal maintained in a certain state is changed. For example, a phrase "applying a signal to an on/off control terminal of a switching element" means that an existing low level voltage (for example, a zero Volt or a direct current (DC) voltage or an AC voltage having a predetermined magnitude) is changed into a high level (for example, a DC voltage or an AC voltage having an amplitude value larger than that of the low level voltage).

In addition, in the present disclosure, touch sensors indicates sensing pads that are performing sensing and non-sensing pads. The sensing pads are touch sensors connected to touch detecting units in order to detect a touch among a plurality of touch sensors, and the non-sensing pads are touch sensors that do not perform detection of a touch and are not connected to the touch detecting unit. The sensing pads become the non-sensing pads after detection of a touch is completed, and any non-sensing pads are changed into sensing pads depending on a predetermined sequence. Therefore, the sensing pads and the non-sensing pads are not fixed, but may be changed depending on a time, and change sequences of the respective sensing pads and non-sensing pads may be sequentially determined depending on a predetermined sequence. A time sharing technique is an example of determining a sequence.

In addition, in the present disclosure, a phrase "detecting a touch" has the same meaning as that a phrase "detecting a touch signal", and a typical example of detection of a touch signal is to detect a difference between a first voltage detected by a touch detecting unit when a conductor such as a finger does not touch or approach a touch sensor, such that a touch capacitance is not formed, and a second voltage detected by a touch detecting unit by a touch capacitance (Ct) formed when the conductor such as the finger overlaps with the touch sensor.

In addition, in the present disclosure, a touch drive IC will be contracted as a touch IC or a TDI.

Further, in the present disclosure, pre-charging and charging and a pre-charging voltage and a charging voltage will be used as the same meaning.

Further, in the present disclosure, sensing pads may include sensor signal lines connecting the sensing pads to each other unless specifically mentioned, and non-sensing pads may include non-sensing pad signal lines connecting the non-sensing pads to each other unless specifically mentioned.

Further, in the present disclosure, source lines and gate lines will be called driving signal lines, and the driving signal lines generally indicate the gate lines and the source lines or indicate only the source lines or only the gate lines.

Further, in the present disclosure, a sub-pixel will also be called a pixel.

Since touch sensors 10 and sensor signal lines 22 according to an exemplary embodiment of the present invention are disposed in a display device, a detailed study on a structure of the display device is required. Although the display device will be described on the basis of an LCD in the present disclosure, a thin film transistor (TFT) substrate of an AMOLED is similar to that of the LCD, and thus, the spirit of the present invention described in the present disclosure is similarly applied to the AMOLED. In addition, since signal lines and pixels are included in all display devices such as a PMOLED, a PDP, or the like, and the present disclosure is a concept of disposing an embedded touch screen based on the signal lines and the pixels, the spirit of the present invention is applied to all the display devices.

FIG. 1 is a view illustrating a structure of an LCD. Referring to FIG. 1, the LCD is formed by attaching a color filter substrate 100 and a TFT substrate 200 to each other by a sealant (not illustrated). In the TFT substrate, three sub-pixels of red/green/blue form one pixel, which acts as a basic pixel unit and is also called a dot. In each of the sub-pixels, a pixel electrode, which is a transparent electrode formed of indium tin oxide (ITO), or the like, is connected to a drain of a TFT 220, and a source line 250 formed of a source metal is connected to a source of the TFT. In addition, a gate line 240 formed of a gate metal is connected to a gate of the TFT.

Color filters 110 such as red color filters R, green color filters G, and blue color filters B are formed on the same lines as those of the sub-pixels of the TFT substrate 200, and a black matrix (BM) 130 for shielding the gate lines 240 or the source lines 250 of the TFTs is formed among the R/G/B.

FIG. 2 is a view illustrating a detailed structure of a thin film transistor (TFT) of FIG. 1. Referring to FIGS. 1 and 2, a gate metal layer formed of a metal component such as copper, aluminum, molybdenum, chromium, or the like, forms the gate line 240 on an upper surface of the TFT substrate 210 formed of glass, plastic, or the like. A source electrode 270 and a drain electrode 260 of the TFT are formed by a source metal layer formed of a metal component such as copper, aluminum, molybdenum, chromium, or the like, above the gate line. In addition, a source line 250 is formed on the same layer by the same source metal layer in the source electrode 270 of the TFT, and transfers an image signal to a pixel electrode 230.

The drain of the TFT 220 is connected to the pixel electrode to form Clc and Cst, and a liquid crystal (not illustrated) reacts by a potential difference between the pixel electrode 230 and a common electrode 120 to form image quality. Since an operation principle and a detailed structure of the TFT 220 are obvious to those skilled in the art, contents unrelated to the present invention are not described, but technical contents obvious to those skilled in the art are reflected in all technical contents of the present disclosure.

Although an example in which the TFT 220 has a TN structure is described, in the case of an LCD using a transversal electric field mode such as an in-plane switching (IPS) mode, a fringe field switching (FFS) mode, or the like, the operation principle of the LCD described above may be similarly applied except that the common electrode 120 of FIG. 1 is positioned on the same layer as that of the TFT substrate 210.

The touch screen of the display device having the embedded touch screen according to an exemplary embodiment of the present invention does not basically interwork with an operation of the display device. That is, the touch screen is operated asynchronously with a driving mechanism of the LCD. In the case in which signals of the touch screen and the display device according to an exemplary embodiment of the present invention have a correlation therebetween, a driving frequency of the display device is about 60 Hz, such that it is not easy to synchronize an operation frequency of a touch generally requiring a driving condition of 100 Hz or more. In addition, in the case of using a method of sensing a touch plural times and removing noise using various filters when static electricity, noise, or the like, is introduced into the touch sensor, when the touch screen is synchronized with the LCD, the touch screen is subordinated to a frequency of the LCD, such that a case in which it is impossible to detect the touch plural times in a limited time may occur.

In order to solve the problem described above, the touch screen according to an exemplary embodiment of the present invention is embedded in the display device, but is operated separately from a driving mechanism of the display device. In some cases, it may be advantageous to synchronize the touch screen with a driving signal mechanism of the display device to detect a touch signal. This case is, for example, a case of improving touch detection sensitivity by synchronizing a ground or changing a specific signal of the LCD. Therefore, the touch screen according to an exemplary embodiment of the present invention supports both of a mode in which it is synchronized with a signal (for example, data enable (DE), Hsync, or Vsync) of the display device and a mode in which it is not synchronized with the signal of the display device.

FIG. 3 illustrates an exemplary embodiment about embedding of the touch screen in the display device having an embedded touch screen, and in the display device according to an exemplary embodiment of the present invention in which a first substrate 100 on which the color filters 110 and the common electrodes 120 are formed and a second substrate 200 in which the pixel electrodes 230 and the driving signal lines are formed are disposed to overlap with each other, a sensor layer including the touch sensors 10 sensing touch signals and sensor signal lines 22 is formed below the driving signal lines.

That is, in this case, the sensor layer is installed between the gate line 240 and the source line 250 constituting the TFT substrate 210 and the TFT 220, and a sensor layer first deposited is formed of a conductive material, and is formed of a metal component such as chromium, copper, aluminum, molybdenum, or the like, or a transparent conductive material such as ITO, CNT, a metal mesh, or the like.

In addition, the touch sensors 10 are patterned and disposed on the sensor layer in a structure in which a plurality of isolated areas are regularly arranged in longitudinal and transversal directions as illustrated in FIG. 4, and the sensor signal lines 22 connecting the touch sensors 10 and a TDI 30 to each other are also disposed on the sensor layer.

In addition, the touch sensors 10 according to an exemplary embodiment of the present invention are disposed at a width wider than those of the gate lines 240 and the source lines 250, may be patterned in a matrix structure in which the plurality of isolated areas are regularly arranged in the longitudinal and transversal directions as illustrated in FIG.

4, and the sensor signal lines 22 connecting the touch sensors 10 and the TDI 30 to each other are also disposed.

Although the touch sensors 10 are installed in five columns in the longitudinal direction and in six rows in the transversal direction in an exemplary embodiment of the present invention, this is only an example, and several tens to several hundreds of touch sensors 10 may be installed in the longitudinal and transversal directions at the time of actually using the display device.

In addition, it is preferable that insulators are deposited and installed on upper surfaces of the touch sensors 10.

The touch sensors 10 according to an exemplary embodiment of the present invention described above are positioned only below the gate lines 240 and the source lines 250, which are signal lines of the LCD, and are disposed at positions that do not overlap with the pixel electrodes 230 in the vertical direction.

This is to prevent deterioration of image quality caused by distortion generated in a voltage applied to the liquid crystal by a capacitor due to coupling between the pixel electrodes 230 and the touch sensors 10 when a rising or falling voltage is applied in order to detect a touch of the touch sensors 10.

However, this structure is appropriate for using an AMOLED or a PMOLED that does not use the liquid crystal.

In a first exemplary embodiment of the present invention, the touch sensors 10 are positioned between the TFT substrate 210 and the gate and source lines 240 and 250. In this case, it is preferable that a width of the touch sensor 10 is wider than those of the gate line 240 and the source line 250. Further, it is preferable that a width of the touch sensor 10 is as wide as possible in a range in which the touch sensor 10 does not have an influence on the liquid crystal. The reason is that touch sensitive may be improved by widely forming a sensing area of the touch sensor 10.

In addition, the touch sensors 10 may also be disposed at edges of the pixel electrodes 230 in a range in which they do not intersect with the pixel electrodes 230 in the vertical direction. In addition, the touch sensors 10 may also be disposed below metals forming storage capacitors Cst. The metals forming the storage capacitors Cst are generally formed of the gate lines 240, and since DC is always applied to the gate lines 240, the gate lines 240 are not affected by driving signals of the sensor signal lines 22 positioned under the gate lines 240.

In addition, in a first exemplary embodiment of the present invention, the touch sensors 10 are disposed in a sub-pixel unit. That is, the touch sensors 10 may be positioned somewhere below the gate lines 240 and the source lines 250 configuring the sub-pixels, and the touch sensors 10 or the sensor signal lines 22 are not installed below certain sub-pixels in order to partition the touch sensors 10.

The sensor signal lines 22 according to an exemplary embodiment of the present invention may be formed of ITO, carbon nano tube (CNT), indium zinc oxide (IZO), zinc tin oxide (ZTO), nano wire, silver nano wire, or the like, which is a transparent conductive material. The reason is that a flash phenomenon is generated by light or an aperture ratio of the LCD is reduced when the sensor signal lines 22 are formed of an opaque metal material.

According to an exemplary embodiment of the present invention, when the touch sensors 10 are positioned below the gate lines 240 and the source lines 250, which are the driving signal lines of the LCD, the term "below" is appropriate in the case in which the TFT substrate 210 is disposed at a lower position as illustrated in FIG. 3. When the TFT substrate of FIG. 3 is overturned by 180 degrees, such that the TFT substrate is disposed at a higher position and the TFT 220 and the touch sensor layer are positioned below the TFT substrate 210, the touch sensors 10 may be positioned above the gate lines 240 and the source lines 250. In the present disclosure, upper and lower portions are defined on the basis of the case in which the TFT substrate 210 is disposed at the lower position. Therefore, even though the TFT substrate 210 is overturned to move to the higher position, such that the upper and lower portions are exchanged with each other, absolute directions of the upper and lower portions are determined on the basis of the case in which the TFT substrate is disposed at the lower position.

In FIG. 5 illustrating an example of a configuration of the touch sensors 10 in the display device having an embedded touch screen according to an exemplary embodiment of the present invention, the touch sensors 10 are divided into 34 partitions in the transversal direction and into 42 partitions in the longitudinal direction, and the numbers of sub-pixels in the transversal direction and the longitudinal direction are 34 and 42, respectively. When it is converted into a resolution, the resolution is 11(H)×42(V). Therefore, when taking into consideration that a high definition (HD) resolution is 1280(H)×800(V), the display device having an embedded touch screen according to an exemplary embodiment of the present invention is a display device having a significantly small size. (In an exemplary embodiment, one sub-pixel remains in an H direction). A display device of 11×42 has been set regardless of a size by way of example in the present exemplary embodiment, and display devices having various resolutions are actually used.

In FIG. 5, only the gate lines 240 and the source lines 250 are shown in the display device of 11×42 and the touch sensors 10 according to an exemplary embodiment of the present invention defined in FIG. 3 are shown below the gate lines 240 and the source lines 250. Thick lines indicate the touch sensors 10 and the sensor signal lines 22, and show that the touch sensors 10 and the sensor signal lines 22 are positioned below the gate lines 240 and the source lines 250.

Referring to FIG. 5, the touch sensors 10 have areas that become small as they become close to the TDI, and are formed in a mesh structure. When the touch sensors 10 are formed in the mesh structure, even though disconnection is partially generated due to a process defect, a probability that the touch sensors 10 will malfunction is significantly reduced.

In an exemplary embodiment of the present invention, the number of sensor signal lines 22 is one or plural, and referring to a touch sensor 10 disposed at a left lower end and a touch sensor 10 disposed at a right upper end, the sensor signal lines 22 are formed to have two branches in an exemplary embodiment of the present invention. The sensor signal lines 22 having the two branches may be bonded to each other in an active area in which the touch sensors 10 are installed or be bonded to each other in a BM area, that is, a non-active area, of the LCD in which the TDI is installed. This is used as a method of improving a yield of a product since another sensor signal line 22 may be used even though disconnection is generated in one sensor signal line 22 in a process. When the plurality of sensor signal lines 22 are used with respect to one touch sensor 10 as described above, a probability that a problem will occur in detecting a touch may be reduced even though disconnection due to a process defect is generated in the sensor signal line.

Again referring to FIG. 3, an insulator is present between the sensor signal line 22 and the gate line 240 or the source line 250, and a parasitic capacitance is formed between the sensor signal line 22 and the gate and source lines 240 and 250 through the medium of the insulator (hereinafter, a parasitic capacitance formed between the touch sensor 10 and the gate line 240 is called Cg, a parasitic capacitance formed between the touch sensor 10 and the source line 250 is called Cs, and an equivalent parasitic capacitance obtained by the sum of Cg and Cs is called Cgs). Cgs is a total parasitic capacitance formed between one touch sensor and the gate and source lines 240 and 250. The insulator has several tens of angstroms ($10^{-10}$) or several micrometers (µm), and referring to Equation of FIG. 21, a magnitude of a parasitic capacitor Cg, Cs, or Cgs has a value hundred times or more larger than a touch capacitance Ct detected by a touch. A touch sensor connected to the other side of the parasitic capacitance Cg/Cs/Cgs is affected by a variation in an analog voltage of a signal line connected to one side of the parasitic capacitance Cg/Cs/Cgs, that is, the source line 250 or a variation in gate-on/off voltages of the gate line 240, such that it is impossible to detect a touch signal. Therefore, a method of allowing the touch sensor 10 not to be affected by the source line 250 or the gate line 240 is required.

FIG. 6 is a view illustrating a display device having an embedded touch screen according to a second exemplary embodiment of the present invention. The display device having an embedded touch screen according to a second exemplary embodiment of the present invention further includes a guard layer (G/L) 295 preventing interference of signals between a touch screen and a signal line.

The guard layer 295 is formed between the touch sensor 10 disposed at the lowermost side and the gate and source lines 240 and 250 constituting the TFT, and overlaps with the touch sensor 10 in a one-to-one scheme, as illustrated in FIG. 5 (however, the guard layer 295 does not overlap with the touch sensor 10 in a one-to-one scheme in a TDI or LDI bonding part except for an A/A). The same voltage as a voltage applied to the sensing pad 10*a* or the non-sensing pad 10*b* is applied to the guard layer.

The G/L 295 according to an exemplary embodiment of the present invention described above is not installed only below the source line 250 or the gate line 240, but may be installed over an entire area of the display device. However, in this method, the voltage applied to the G/L 295 may have an influence on a pixel area of the display device to cause deterioration of image quality.

In a second exemplary embodiment of the present invention, a first insulator 285 is installed on upper surfaces of the touch sensors 10. The first insulator 285 is a material electrically insulating the touch sensor 10 and the G/L 295 from each other. The first insulator 285 may be formed only between the touch sensors 10 and the G/L 295, as illustrated in FIG. 6. However, this method is not preferable since a separate mask is required. In addition, it is preferable that the first insulator 285 is applied over an entire active area of the display device.

In addition, in a second exemplary embodiment of the present invention, a second insulator 286 for insulating the G/L 295 from a component of the display device, such as the gate line 240 of the TFT, is installed on an upper surface of the G/L 295. The second insulator 286 may also be partially patterned as in FIG. 5, but is not preferable since it requires a separate mask, and it is preferable that the second insulator 286 is applied over an entire A/A of the display device.

In an exemplary embodiment of the present invention, it is preferable that the first insulator 285 and the second insulator 286 are formed of the same material, and referring to FIG. 6, pads for applying signals at one side of the display device are opened in the sensor signal line 22 and the G/L 295, and a flexible circuit board such as a flexible printed circuit (FPC), a chip on flexible printed circuit (COF), or the like, is bonded through the pads. In this case, in order to expose a pad of a sensor signal line bonding part 297 and a pad for transferring the signal to the G/L 295, the first insulator 285 and the second insulator 286 are etched to open the pads. In this case, patterning may be easily performed using one mask when the first insulator 285 and the second insulator 286 are formed of the same material.

Since a parasitic capacitance formed between the G/L 295 and the gate line 240 or the source line 250 is significantly large, driving capability of a capacitor, which is a driving element, should be significantly large in order to drive the G/L by an alternating voltage. Generally, in order for the TDI 30 to drive the G/L 295, a dedicated output terminal should have significantly capacitor driving capability, which leads to an increase in a size of the TDI 30 to cause an increase in a cost.

In order to solve this problem, the G/L 295 is driven using a dedicated buffer or operation amplifier (OPAMP) rather than the TDI 30 in a second exemplary embodiment of the present invention. Referring to FIG. 7, an alternating voltage generated in a dedicated pin of the TDI is applied to the G/L 295 through the buffer or the OPAMP. The application of the alternating voltage to the G/L 295 is performed through a G/L bonding part 296 of FIG. 6. The buffer or the OPAMP is positioned outside the TDI 30, and has driving capability for driving a capacitor having a large capacitance.

The buffer or the operation amplifier according to an exemplary embodiment of the present invention, which is an electrical element outputting the alternating voltage received from the TDI 30 as it is, has an advantage such as large driving capability. Since the G/L 295 has a wide area and a large resistance, when one buffer or OPAMP is used, driving capability may be insufficient. Therefore, a plurality of buffers or OPAMPs may be used. It is preferable that the plurality of buffers or OPAMPs are appropriately disposed at a corner portion, a central portion, a left portion, or a right portion of the G/L 295 to allow magnitudes of the alternating voltage not to be different from each other at each position of the G/L 295.

Alternatively, one of alternating voltages of a power IC (not illustrated) may be applied to the G/L 295. One of the alternating voltages of the power IC is an alternating ground voltage of the power IC.

FIG. 8 is a view for describing a method of applying required signals to a display device, a touch sensor 10, and a G/L 295 in the display device having an embedded touch screen according to an exemplary embodiment of the present invention. In FIG. 8, part X is an area in which an image is displayed or the touch sensors 10 according to an exemplary embodiment of the present invention are installed, and will be called an active area or an A/A in the present disclosure. The first pads 310 of FIG. 8 are pads to which signals for the display device are applied, and signals transferred from the LDI are applied to the first pads 310. In addition, the second pads 320 receive signals transferred from the TDI, the buffer, or the like, and are connected to the G/L 295. In addition, the third pads 330 are pads connected to the touch sensors 10.

In FIG. 8 illustrating an example about connection of driving signal lines according to an exemplary embodiment of the present invention, driving signals of the display device transferred from the LDI are denoted by solid lines, signals transferred to the touch sensors are denoted by dotted lines, and signals transferred to the G/L are denoted by double solid lines. Since the respective signal lines are positioned on different layers, a short-circuit is not generated.

In addition, in the display device having an embedded touch screen according to an exemplary embodiment of the present invention, different substrates, for example, flexible circuit boards such as FPC or COF may be attached onto pads for transferring the signals to the LDI, the TDI 30, and the G/L 295, respectively. Alternatively, one flexible circuit board may be attached onto the pads in order to reduce a cost.

In addition, although not illustrated, a chip on glass (COG) type of LDI and a COG type of TDI may be attached to one side of the display device rather than the pads. Referring to FIG. 8, the LDI and the TDI may be attached in a COG form to an area in which the pads are positioned. Therefore, a quantity of signals transferred from the outside to the display device may be significantly reduced, a size of the flexible circuit board may be reduced, and a cost may be reduced.

In the case in which a COG type of IC is used, the signals transferred to the G/L 295 may be generated in the COG type of TDI 30 and be transferred to the G/L 295, or may be generated in the COG type of TDI 30 and be transferred to the G/L 295 through the flexible circuit board attached to a lower side of the COG type of TDI 30, an external buffer, and the flexible circuit board.

In first and second exemplary embodiments in which the touch sensor 10 is positioned below the signal line as described above by way of example with reference to FIGS. 3, 5, and 6, in the case in which a person's hand touches an upper portion of the color filter of FIG. 1, the touch sensor 10 is covered by the gate line 240 or the source line 250, such that it is impossible to detect a touch signal. In order to overcome the problem described above, the display device is set so that the TFT substrate 210 is directed toward an upward direction and the color filter substrate 100 is directed toward a downward direction. Therefore, the touch sensor 10 is directed toward the uppermost portion, and any resistance material is not present on an upper surface of the touch sensor 10, such that it is possible to detect a touch by an object such as a finger, or the like.

Methods of manufacturing the display devices having an embedded touch screen according to first and second exemplary embodiments of the present invention described above will be described below.

FIG. 9 is an entire flow chart of a method of manufacturing a display device having an embedded touch screen according to an exemplary embodiment of the present invention, the method of manufacturing a display device having an embedded touch screen includes forming the second substrate 200 (S100) and forming the first substrate (S200), and S100 according to an exemplary embodiment of the present invention includes forming the touch sensors 10 (S110) and forming the driving signal lines and the pixel electrodes above the touch sensors 10 (S120).

FIG. 10 is a detailed flow chart of S110. First, the touch sensors 10 according to an exemplary embodiment of the present invention are deposited (S111) before the gate lines 240, which are components of the TFT of the LCD, are deposited. In S111, a conductive material for forming the touch sensors 10 according to an exemplary embodiment of the present invention is deposited on the TFT substrate 210 before the source metal or the gate metal of the LCD is deposited, and the conductive material first deposited on the TFT substrate 210 in S111 is a metal component such as chromium, copper, aluminum, molybdenum, or the like, or a transparent conductive material such as ITO, CNT, metal mesh, or the like.

Then, the touch sensors 10 are patterned on the first deposited sensor layer in the structure in which the plurality of isolated areas are regularly arranged in the longitudinal and transversal directions as illustrated in FIG. 4, and the sensor signal lines 22 connecting the touch sensors 10 and the TDI 30 to each other are formed on the sensor layer (S113).

In S113 according to an exemplary embodiment of the present invention, the touch sensors 10 may be formed in the matrix structure in the longitudinal and transversal directions, as illustrated in FIG. 4. However, a form of the touch sensors 10 is not limited to an exemplary embodiment of the present invention. That is, the touch sensors 10 may be installed in several tens to several hundreds of columns and rows.

In addition, in S113, it is preferable that the touch sensors 10 are disposed in consideration of a sub-pixel unit, the touch sensors 10 may be positioned somewhere below the gate lines 240 and the source lines 250 constituting the sub-pixels, and the touch sensors 10 or the sensor signal lines 22 are not installed below certain sub-pixels in order to partition the touch sensors 10.

In FIG. 5 illustrating another form of the touch sensors 10 formed in S113, in the case in which the number of sub-pixels is 34 in the transversal direction and is 42 in the longitudinal direction, only the gate lines 240 and the source lines 250 are shown in the display device of 11×42, and the touch sensors 10 according to an exemplary embodiment of the present invention defined in FIG. 3 are formed in the mesh structure in the display device. In FIG. 5, thick lines indicate the touch sensors 10 and the sensor signal lines 22, and show that the touch sensors 10 and the sensor signal lines 22 are positioned below the gate lines 240 and the source lines 250. In addition, in S113 according to an exemplary embodiment of the present invention, the touch sensors 10 have areas that become small as they become close to the TDI 30. Therefore, even though disconnection is partially generated due to a process defect, a probability that the touch sensors 10 will malfunction is significantly reduced.

In addition, in S113 according to an exemplary embodiment of the present invention, it is preferable that a width of the touch sensor 10 is as wide as possible in a range in which the touch sensor 10 does not have an influence on the liquid crystal, and when a sensing area of the touch sensor 10 becomes wide, touch sensitivity is improved.

The sensor signal lines 22 formed in S113 according to an exemplary embodiment of the present invention are formed of ITO, CNT, IZO, ZTO, nano wire, silver nano wire, or the like, which is a transparent conductive material. The reason is that a flash phenomenon is generated by light or an aperture ratio of the LCD is reduced when the sensor signal lines 22 are formed of an opaque metal.

However, in an exemplary embodiment of the present invention, the sensor signal lines 22 may include transparent wirings formed of a transparent conductive material and metal wirings formed of a metal. The transparent wirings may be formed in the active area of the display device and the transparent wirings or the metal wirings may be formed in the non-active area of the display device.

In addition, in S113, the number of sensor signal lines 22 may be one or plural, and two sensor signal lines 22 are formed with respect to the touch sensor 10 in an exemplary embodiment illustrated in FIG. 5. The sensor signal lines 22 may be bonded to each other in the active area in which the touch sensors 10 are installed or be bonded to each other in the BM area, that is, the non-active area, of the LCD in which the TDI is installed. This is used as a method of improving a yield of a product since another sensor signal line 22 may be used even though disconnection is generated in one sensor signal line 22. When the plurality of sensor signal lines 22 are used with respect to one touch sensor 10 as described above, a probability that a problem will occur in detecting a touch may be reduced even though disconnection due to a process defect is generated in the sensor signal line.

Then, the first insulator is deposited and installed on the upper surfaces of the touch sensors 10 (S115), and the G/L 295 is formed above the first insulator (S117).

The first insulator formed in S115 electrically insulates the touch sensors 10 and the G/L 295 from each other, and it is preferable that the first insulator is applied over the entire active area (A/A) of the display device.

In addition, the G/L 295 formed in S117 prevents interference of signals between the touch screen and the driving signal lines of the display device, the same voltage as the voltage applied to the sensing pad 10a or the non-sensing pad 10b is applied to the G/L 295 or an alternating AC voltage is applied to the G/L 295, and may be installed over the entire area of the display device. However, the voltage applied to the G/L 295 may have an influence on the pixel area of the display device to cause deterioration of image quality. Since a function of the G/L 295 according to an exemplary embodiment of the present invention has been described above, an addition description will be omitted.

Then, the second insulator 286 is installed on the upper surface of the G/L 295 (S119), and it is preferable that the second insulator 286 in S119 is applied to the entire A/A of the display device.

In addition, in an exemplary embodiment of the present invention, although the first insulator 285 in S115 and the second insulator 286 in S119 may be formed of different materials, it is preferable that they are formed of the same material.

In more detail, the pads for applying signals at one side of the display device are opened in the sensor signal line 22 and the G/L 295, and a flexible circuit board such as a FPC, a COF, or the like, for applying required signals is bonded to the pads. In this case, in order to expose the pad of the sensor signal line bonding part 297 and the pad for transferring the signal to the G/L 295, the first insulator 285 and the second insulator 286 are etched to open the pads. In this case, patterning may be easily performed using one mask when the first insulator 285 and the second insulator 286 are formed of the same material.

In addition, in the case in which the first insulator 285 and the second insulator 286 are formed of the same material, the first insulator 285 and the second insulator 286 may be simultaneously etched and removed using one mask at the time of exposing the pads by patterning the pads for transferring the signals to the touch sensors and the G/L 295.

The one mask is a separate mask unrelated to a process of manufacturing the TFT in a process of the LCD. In this case, in an exemplary embodiment of the present invention, a mask is required to pattern the touch sensors, and a mask is also required to pattern the G/L 295. In addition, since a mask is required to pattern the first and second insulators 285 and 286, three additional masks are required in addition to the mask required in the process of the LCD.

In order to reduce the number of additional masks from 3 to 2, in an exemplary embodiment of the present invention, portions for patterning signal applying pad parts of the first and second insulators 285 and 286 may be added to the mask used in the process of manufacturing the TFT of the LCD, such that the signal applying pad parts of the first and second insulators 285 and 286 may be removed by etching. As an example, a protection layer may cover an upper surface of the TFT and be partially etched in a final step of the process of the LCD, and portions for etching the first and second insulators 285 and 286 may be added to a mask in the final step of the process of the LCD in order to expose the signal applying pad parts to the touch sensors 10 and the G/L 295. In this case, the display device having an embedded touch screen according to an exemplary embodiment of the present invention may be manufactured using two additional masks in addition to the mask required in the process of manufacturing the TFT.

After S119, the driving signal lines and the pixel electrodes are formed (S120).

FIG. 11 is a detailed flow chart of S120. First, the gate lines 240 are formed using the gate metal layer formed of a metal component (S121) (since a step of forming composite deposited patterns such as SiNx/n+a-Si/a-Si, and the like, after S121 is well-known in the related art, a description and illustration in the drawings are omitted in the present invention), and the pixel electrodes 230 are formed using the conductive material layer (S123). At the time of form the pixel electrodes 230 in S123, the pixel electrodes 230 are formed at positions that do not overlap with the touch sensors 10. In addition, in S123, the pixel electrodes 230 may also be formed in positions adjacent to the touch sensors 10 as long as they do not intersect with the touch sensors 10 in the vertical direction.

The reason is that when the touch sensor 10 is positioned below the pixel electrode 230 of FIG. 3, distortion is generated in a voltage applied to the liquid crystal by a capacitor generated by coupling between the pixel electrode 230 and the touch sensor 10 at the time of applying a rising or falling voltage to the touch sensor 10 in order to detect a touch as described below, such that deterioration of image quality is generated. However, this structure is appropriate for being used in the AMOLED or the PMOLED that does not use the liquid crystal.

Then, the source electrodes 270 and the drain electrodes 260 are formed using the source metal layer formed of a metal component above the gate lines 240 and the source lines 250 are formed in the same metal layer (S125), and the protection layer 280 is formed above the source electrodes 270, the drain electrodes 260, and the source lines 250 (S127).

In an exemplary embodiment of the present invention, at the time of forming the gate lines 240 and the source lines 250 in S121 and S125, one or more gate lines 240 and the source lines 250 are formed above the touch sensor 10, and widths of the gate lines 240 and the source lines 250 are narrower than that of the touch sensor 10. In addition, in S121 and S125, the touch sensors 10 are disposed in a sub-pixel unit. That is, the touch sensors 10 may be positioned somewhere below the gate lines 240 and the source lines 250 configuring the sub-pixels, and the touch sensors 10 or the sensor signal lines 22 are not installed below certain sub-pixels in order to partition the touch sensors 10.

In S121 and S127, the touch sensors 10 are positioned only below the gate lines 240 and the source lines 250, which are the signal lines of the LCD. When the touch sensors 10 are positioned only below the gate lines 240 and the source lines 250 and are not positioned below the pixel electrodes 230, the touch sensors 10 do not have an influence on the pixel electrodes 230, such that deterioration of image quality due to a malfunction of the liquid crystal is not generated.

Referring to FIG. 3, the insulator 285 is present between the touch sensor 10 and the gate line 240 or the source line 250, and a parasitic capacitance is formed between the sensor signal line 22 and the gate and source lines 240 and 250 through the medium of the insulator 285 (hereinafter, a parasitic capacitance formed between the touch sensor 10 and the gate line 240 is called Cg, a parasitic capacitance formed between the touch sensor 10 and the source line 250 is called Cs, and an equivalent parasitic capacitance obtained by the sum of Cg and Cs is called Cgs). Cgs is a total parasitic capacitance formed between one touch sensor 10 and the gate and source lines 240 and 250. The insulator 285 has several tens of angstroms ($10^{-10}$) or several micrometers (μm), and referring to Equation of FIG. 21, a magnitude of a parasitic capacitor Cg, Cs, or Cgs has a value hundred times or more larger than a touch capacitance Ct detected by a touch. A touch sensor 10 connected to the other side of the parasitic capacitance Cg/Cs/Cgs is affected by a variation in an analog voltage of a signal line connected to one side of the parasitic capacitance Cg/Cs/Cgs, that is, the source line 250 or a variation in gate-on/off voltages of the gate line 240, such that it is impossible to detect a touch signal. Therefore, in an exemplary embodiment of the present invention, interference between the touch screen and the driving signal line may be prevented through the G/L 295 formed in S117.

The second substrate 200 is formed through S110 to S120 described above, S117 and S119 are omitted after S115 is performed in the method of manufacturing a display device having an embedded touch screen according to a first exemplary embodiment of the present invention, and S111 to S127 are sequentially performed in the method of manufacturing a display device having an embedded touch screen according to a second exemplary embodiment of the present invention.

In addition, the method of manufacturing a display device having an embedded touch screen according to an exemplary embodiment of the present invention includes forming the first substrate 100 (S200), which is performed separately from S100. In S200, as in a detailed flow in FIG. 12, a pattern of the black matrix (BM) 130 is formed on a glass substrate (S210), patterns of R, G, and B color filters 110 are formed in an area in which the pattern of the black matrix 130 is not formed (S220), and the common electrodes 120 are formed above the patterns of the R, G, and B color filters 110 (S230).

After S100 and S200 are performed, the first substrate 100 is disposed at a higher position, the second substrate 200 is disposed at a lower position, and the first and second substrates 100 and 200 are attached to each other by a sealant (S300). In S300, the common electrode 120 formed above the first substrate 100 and the protection layer 280 and the pixel electrode 230 formed above the second substrate 200 become surfaces overlapping with each other.

Then, the first substrate 100 and the second substrate 200 bonded to each other in S300 are reversed in the vertical direction (S400). The sensor layer is positioned above the pixel electrode 230 by performing S400.

Then, the liquid crystal is injected between the first and second substrates 100 and 200 bonded to each other (S500), and the TDI 30 or the LDI is attached to the display device (S600). In S600 according to an exemplary embodiment of the present invention, a flexible circuit board to which the LDI or the TDI 30 is attached may be attached to the display device or the LDI or the TDI 30 may be attached to the display device in a chip on glass (COG) scheme.

In S600 according to an exemplary embodiment of the present invention, different substrates, for example, flexible circuit boards such as FPC or COF may be attached onto pads for transferring the signals to the LDI, the TDI 30, and the G/L 295, respectively. Alternatively, one flexible circuit board may be attached onto the pads in order to reduce a cost.

Although not illustrated, a COG type of LDI and a COG type of TDI 30 may be attached to one side of the display device rather than the pads. Referring to FIG. 8, the LDI and the TDI 30 may be attached in a COG form to an area in which the pads are positioned. Therefore, a quantity of signals transferred from the outside to the display device may be significantly reduced, such that a size of the flexible circuit board may be reduced, and a cost may be reduced.

In an exemplary embodiment of the present invention, it is preferable that S600 further includes forming buffers or operational amplifiers at one side surface or a plurality of side surfaces of the guard layer, the buffers or operational amplifiers amplifying and providing driving signals of the TDI.

That is, in the case in which a COG type of IC is used, the signals transferred to the G/L may be generated in the COG type of TDI and be transferred to the G/L 295, or may be generated in the COG type of TDI 30 and be transferred to the G/L through the flexible circuit board attached to a lower side of the COG type of TDI, an external buffer, and the flexible circuit board. Alternatively, one of alternating AC voltages may be transferred to the G/L.

Since a parasitic capacitance formed between the G/L 295 and the gate line 240 or the source line 250 is significantly large, driving capability of a capacitor, which is a driving element, should be significantly large in order to drive the G/L by an alternating voltage. Generally, in order for the TDI 30 to drive the G/L 295, a dedicated output terminal should have significantly capacitor driving capability, which leads to an increase in a size of the TDI 30 to cause an increase in a cost.

In order to solve this problem, the G/L 295 is driven using a dedicated buffer or operation amplifier (OPAMP) rather than the TDI 30 in an exemplary embodiment of the present invention. Referring to FIG. 7, an alternating voltage generated in a dedicated pin of the TDI 30 is applied to the G/L 295 through the buffer or the OPAMP. The application of the alternating voltage to the G/L 295 is performed through a G/L bonding part 296 of FIG. 6. The buffer or the OPAMP is positioned outside the TDI 30, and has driving capability for driving a capacitor having a large capacitance.

The buffer or the operation amplifier, which is an electrical element outputting the alternating voltage received from the TDI 30 as it is, has an advantage such as large driving capability. Since the G/L 295 has a wide area and a large resistance, when one buffer or OPAMP is used, driving capability may be insufficient. To this end, a plurality of buffers or OPAMPs are used. The plurality of buffers or OPAMPs are appropriately disposed at a corner portion, a central portion, a left portion, or a right portion of the G/L 295 to allow magnitudes of the alternating voltage not to be different from each other at each position of the G/L 295.

The display device having an embedded touch screen according to an exemplary embodiment of the present invention is characterized in that the touch screen is positioned on upper surfaces of the TFT and the source lines 250 and the gate lines 240 constituting the TFT. When the touch screen is positioned below the source lines 250 and the gate lines 240, the LCD should be overturned by 180 degrees. However, it is impossible to overturn the LCD or it is possible to mount the touch sensors on upper surfaces of the signal lines in an LCD using an IPS mode or an FFS mode corresponding to a transversal electric field mode in which Vcom is not present in the color filter substrate of FIG. 5.

Before describing the technical spirit of mounting the touch sensors on the upper surfaces of the signal lines as described above, a structure of an LCD using the transversal electric field mode will be described below since the IPS mode or the FFS mode corresponding to the transversal electric field mode in which the touch sensors according to an exemplary embodiment of the present invention will be embedded is different from the TN structure.

FIG. 13 is a view illustrating a configuration of a TFT substrate among components of an LCD using a transversal electric field mode. In the LCD using the transversal electric field mode, common electrodes 120 are not scattered over an entire surface of a color filter, but are formed in only a partial area of a TFT substrate rather than the color filter, unlike the LCD using the TN mode described above.

As illustrated in FIG. 13, gate lines 240 and source lines 250 are disposed in the longitudinal and transversal directions on an upper surface of the TFT substrate, and areas partitioned by the gate lines 240 and source lines 250 form pixels. TFTs 220 switching image signals are installed in the pixels. Gate electrodes 265 of the TFTs 220 are connected to the gate lines 240 to receive scanning signals applied thereto, and source electrodes 270 and drain electrodes 260 are connected to the source lines 250 and pixel electrode signal lines 235, respectively. In addition, a semiconductor layer 257 of the TFT 220 form a channel between the source electrode 270 and the drain electrode 260 in order to apply an image signal to a liquid crystal layer. Common electrode signal lines 125 are formed in parallel with the pixel electrode signal lines 235 in the pixels, as illustrated.

In the LCD having the configuration as described above, when the TFTs 220 are operated to apply the image signals to the pixel electrode signal lines 235, transversal electric fields that are substantially in parallel with each other are generated between the common electrode signal lines 125 and the pixel electrode signal lines 235, and liquid crystal molecules move on a plane.

Although a case in which the common electrode signal lines 125 are positioned below the pixel electrode signal lines 235 has been illustrated in FIG. 3, the common electrode signal lines 125 may also be positioned on upper surfaces of the pixel electrode signal lines 235 with an insulator interposed therebetween.

FIG. 14 is a view illustrating an example of a display device having an embedded touch screen according to an exemplary embodiment of the present invention using a Vcom electrode in a transversal electric field mode. Referring to FIG. 14, eight pixels partitioned by gate line 240 and source lines 250 are present, and common electronic signal lines 125 of four pixels are collected to form one common electrode 120 partitioned by a solid line. The solid line of FIG. 14 is a virtual partition representing that the common electrode signal lines 125 are collected in one common electrode 120, and in reality, only common electrode signal lines 125 denoted by an oblique line are present.

Four common electrode signal lines 125 are coupled and are electrically connected to each other between common electrode signal lines 125 of different pixel electrodes 230 as in the left of a lower common electrode 120 or are coupled and are electrically connected to each other on upper surfaces or lower surfaces of the gate lines 240 or the source lines 250 therebetween, thereby making it possible to form one common electrode 120.

As described above, the common electrodes 120 at which a plurality of common electrode signal lines 125 are coupled to each other may be operated as the touch sensors according to an exemplary embodiments of the present invention, and the sensor signal lines 22 connect the common electrodes 120 to the TDI 30.

The common electrodes 120 are also installed on upper surfaces or lower surfaces of the gate lines 240 or the source lines 250 in order to increase contact areas with an object such as a finger, or the like, in addition to a general case in which they are positioned in pixel parts.

Referring to A and B of FIG. 14, the sensor signal lines 22 are installed on side surfaces of the source lines 250. However, actually, the sensor signal lines 22 are disposed on the upper surfaces or the lower surfaces of the source lines 250 so as to overlap with the source lines 250, such that they are not viewed with the naked eyes, and connect the common electrodes 120 operated as the touch sensors 10 to the TDI 30.

Although four common electrode signal lines 125 are disposed in one common electrode 120 in FIG. 14, several tens to several hundreds of common electrode signal lines 125 actually form one common electrode 120.

A significant number of pixels are present in the display device. For example, an HD display device has pixels of 1280×720, a significant number of common electrodes 120 according to an exemplary embodiment of the present invention should be installed in the LCD using the transversal electric field mode. FIG. 14 illustrates a shape in which the common electrodes 120 are disposed in the transversal electric field mode. Referring to FIG. 14, a plurality of common electrodes 120 in the transversal electric field mode are installed in the transversal and longitudinal directions, and each common electrode 120 is connected to one sensor signal line 22 to thereby be connected to the TDI 30.

The common electrode 120, which is a portion constituting the pixel, should be a transparent electrode formed of ITO. Since the sensor signal lines 22 connected to the common electrodes 120 are installed above or below the gate lines 240 or the source lines 250, the sensor signal lines 22 do not need to be transparent electrodes. When the sensor signal lines 22 connected to the common electrodes 120 are formed of a metal such as copper, aluminum, or the like, they have a resistance lower than that of the transparent electrode, which is advantageous in capturing a touch signal.

The sensor signal lines 22 may be patterned and manufactured using a separate dedicated mask. When the sensor signal lines 22 are manufactured commonly using a source metal, a gate metal, or a metal mask in a process of manufacturing the TFT, the number of masks is reduced, thereby making it possible to reduce a manufacturing cost.

FIG. 15 illustrates a display device having an embedded touch screen according to a third exemplary embodiment of the present invention. In FIG. 15, the touch sensors 10 are positioned on upper surfaces of the gate lines 240 or the source lines 250, and have a mesh structure as illustrated in FIG. 5. The display device having an embedded touch screen according to a third exemplary embodiment having this structure may be used in a transverse electric field mode such as an IPS mode, or the like, in which the common electrode 120 of FIG. 1 is not present, or may be used in a state in which Vcom present in an area of the BM 130 between the RGB color filters 110. However, connection points between the common electrodes 120 should remain in order to interconnect the common electrodes 120.

The touch sensors 10 are installed above the gate lines 240 and the source lines 250, and are disposed at a width wider than those of the gate lines 240 and the source lines 250. In addition, the touch sensors 10 may be formed of the common electrodes 120 of FIG. 14, and are formed in the mesh structure as illustrated in FIG. 5 or are formed in the matrix structure as illustrated in FIG. 4. In addition, in the case in which the touch sensors 10 are formed in the matrix structure as illustrated in FIG. 4, the touch sensors 10 may or may not be formed in the mesh structure as illustrated in FIG. 5. In addition, in the case in which the touch sensors 10 are formed in the matrix structure as illustrated in FIG. 4, the touch sensors 10 may be formed in a mixture structure of the mesh structure as illustrated in FIG. 5 and a structure that is not the mesh structure as illustrated in FIG. 5. For example, some of the touch sensors 10 may not have the mesh structure, and the other of the touch sensors 10 may have the mesh structure. In addition, in the case in which the touch sensors 10 are formed in the matrix structure, it is preferable that the touch sensors 10 have areas that become small as they become close to the TDI 30.

In addition, it is preferable that the touch sensors 10 are disposed at positions adjacent to the pixel electrodes 230, are disposed so as not to overlap with the pixel electrodes 230 in the vertical direction, and are installed in the sub-pixel unit.

In addition, the number of sensor signal lines 22 connected to the touch sensors 10 is one or plural, and in the case in which the number of sensor signal lines 22 is plural, the sensor signal lines are bonded to each other in the A/A or are bonded to each other in the non-A/A in which the TDI 30 is disposed.

In addition, the sensor signal lines 22 are installed above the gate lines 240 and the source lines 250, and include transparent wirings formed of a transparent conductive material such as indium tin oxide (ITO), antimony tin oxide (ATO), carbon nano tube (CNT), indium zinc oxide (IZO), nano wire, silver nano wire, or the like, and metal wirings formed of a metal. Here, it is preferable that the transparent wirings are formed in the A/A of the display device and the transparent wirings or the metal wirings are formed in the non-A/A of the display device. Alternatively, the sensor signal lines 22 are not installed above the gate lines 240 and the source lines 250, but may be installed over the entire area of the display device, such as a pixel area of the display device.

In the case in which the touch sensors 10 are positioned on the upper surfaces of the gate lines 240 or the source lines 250 as described above, the BM 130 of the color filters 110 visually blocks the touch sensors 10 when the color filters 110 are coupled to the TFT substrate 210. Therefore, even though a metal is used as a material of the touch sensors 10, a flash phenomenon of the metal is not generated. Accordingly, the metal such as copper, aluminum, or the like, may be used as the material of the touch sensors 10, such that a resistance is reduced, thereby making it possible to more rapidly detect a touch signal and reduce a consumed current.

A protection layer may be added on upper surfaces of the touch sensors of FIG. 15, if necessary.

Therefore, in the display device having an embedded touch screen according to a third exemplary embodiment of the present invention, the touch sensors 10 positioned on the upper surfaces of the gate lines 240 and the source lines 250 malfunction by changes in voltages of the gate lines 240 and the source lines 250, and a display device having an embedded touch screen according to a fourth exemplary embodiment of the present invention further including a G/L 295 is suggested in order to solve this problem.

FIG. 16 is a view illustrating a display device having an embedded touch screen according to a fourth exemplary embodiment of the present invention. When the touch sensors 10 are positioned in any area of the active area of the display device or on upper surfaces of the gate lines 240 and the source lines 250, a G/L 295 is installed between the touch sensors 10 and the gate and source lines 240 and 250. Although an example in which the touch sensors 10 are installed on the upper surfaces of the gate lines 240 and the source lines 250 has been illustrated in FIG. 16, the touch sensors 10 may be disposed on any positions such as the gate lines 240, the source lines 250, and the like, of the display device except for upper surfaces of driving signal lines of the display device. In addition, this display device includes an AMOLED, a PMOLED, or the like, as well as an LCD.

Referring to FIG. 16, the touch sensors 10 are positioned on upper surfaces of TFTs constituting the display device, the first insulator 285 is positioned below the touch sensors 10, and the G/L 295 is positioned below the first insulator. It is preferable that the first insulator 285 is applied over the entire active area (A/A) of the display device.

The G/L 295 or the touch sensors 10 are positioned on the upper surfaces of the gate lines 240 and the source lines 250 or in any area of the A/A of the display device, are formed in the mesh structure as illustrated in FIG. 5 or is formed in a non-mesh structure as illustrated in FIG. 4, and a DC or alternating driving voltage is applied to the G/L 295.

All of the features of the present invention are similarly applied to the case in which the touch sensors 10 are positioned above the gate lines 240 and the source lines 250, similar to the display devices having an embedded touch screen according to the first and second exemplary embodiments corresponding to the case in which the touch sensors 10 are positioned below the signal lines.

After the touch sensors 10 are formed on the uppermost surface of FIG. 16, a second insulator 286 is not applied, which accomplishes a cost reducing effect. However, the second insulator 286 may be installed on upper surfaces of the touch sensors 10, if necessary.

In addition, it is preferable that the display device having an embedded touch screen according to a fourth exemplary embodiment of the present invention further includes a buffer or an operational amplifier (OPAMP) amplifying the driving signals of the TDI transferred to the G/L 295, similar to the display device having an embedded touch screen according to the second exemplary embodiment.

Methods of manufacturing the display devices having an embedded touch screen according to third and fourth exemplary embodiments of the present invention will be described below.

FIG. 17 is a flow chart of a method of manufacturing a display device having an embedded touch screen according to another exemplary embodiment of the present invention, the method of manufacturing a display device having an embedded touch screen includes forming the second substrate 200 (S100) and forming the first substrate (S200), and S100 according to an exemplary embodiment of the present invention mainly includes forming the driving signal lines and the pixel electrodes 230 on the TFT substrate 210 (S130) and forming the sensor layer above the driving signal lines and the pixel electrodes 230 or in any area of the A/A of the display device (S140).

FIG. 18 is a detailed flow chart of S130. In S130, the gate lines 240 are formed using a gate metal layer formed of a metal component (S131), the pixel electrodes 230 are formed using the conductive material layer (S133), the source electrodes 270 and the drain electrodes 260 are formed using the source metal layer formed of the metal component above the gate lines 240 and the source lines 250 are formed in the same metal layer (S135), and the protection layer 280 is formed above the source electrodes 270, the drain electrodes 260, and the source lines 250 (S137).

Next, S140 is performed. In S140 according to an exemplary embodiment of the present invention, as in a detailed flow illustrated in FIG. 19, the G/L 295 is formed above the protection layer 280 (S141), the first insulator 285 is formed above the G/L 295 (S143), the sensor layer is deposited on the first insulator 285 (S145), the isolated touch sensors 10 and the sensor signal lines 22 connecting the touch sensors 10 and the TDI 30 to each other are formed on the sensor layer (S147), and the protection layer 280 or the second insulator 286 is, if necessary, deposited on the touch sensors 10 and the sensor signal lines 22 (S149).

S141 and S143 are omitted in the method of manufacturing the display device having an embedded touch screen according to a third exemplary embodiment of the present invention described above, and S141 to S149 are sequentially performed in the method of manufacturing the display device having an embedded touch screen according to a fourth exemplary embodiment of the present invention described above.

The method of manufacturing a display device having an embedded touch screen according to an exemplary embodiment of the present invention includes forming the first substrate 100 (S200), which is performed separately from S100. In S200, as in an detailed flow of FIG. 12 mentioned in the description for the first and second exemplary embodiments, a pattern of the black matrix (BM) 130 is formed on a glass substrate (S210), patterns of R, G, and B color filters 110 are formed in an area in which the pattern of the black matrix 130 is not formed (S220), and the common electrodes 120 are formed above the patterns of the R, G, and B color filters 110 (S230).

After S100 and S200 are performed, the first substrate 100 is disposed at a higher position, the second substrate 200 is disposed at a lower position, and the first and second substrate 100 and 200 are attached to each other by a sealant (S300). In S300, the common electrode 120 formed on the first substrate 100 and the protection layer 280 or the touch sensor 10 and the sensor signal lines 22 formed on the second substrate 200 become surfaces overlapping with each other.

Then, the liquid crystal is injected between the first and second substrates 100 and 200 bonded to each other (S500), and the TDI 30 or the LDI is attached to the display device (S600). In S600 according to an exemplary embodiment of the present invention, a flexible circuit board to which the LDI or the TDI 30 is attached may be attached to the display device or the LDI or the TDI 30 may be attached to the display device in a chip on glass (COG) scheme.

In S600 according to an exemplary embodiment of the present invention, different substrates, for example, flexible circuit boards such as FPC or COF may be attached onto pads for transferring the signals to the LDI, the TDI 30, and the G/L 295, respectively. Alternatively, one flexible circuit board may be attached onto the pads in order to reduce a cost.

Although not illustrated, a COG type of LDI and a COG type of TDI 30 may be attached to one side of the display device rather than the pads. Referring to FIG. 8, the LDI and the TDI 30 may be attached in a COG form to an area in which the pads are positioned. Therefore, a quantity of signals transferred from the outside to the display device may be significantly reduced, such that a size of the flexible circuit board may be reduced, and a cost may be reduced.

In addition, in an exemplary embodiment of the present invention, it is preferable that S600 further includes forming buffers or operational amplifiers at one side surface or a plurality of side surfaces of the guard layer, the buffers or operational amplifiers amplifying and providing driving signals of the TDI.

That is, in the case in which a COG type of IC is used, the signals transferred to the G/L may be generated in the COG type of TDI and be transferred to the G/L, or may be generated in the COG type of TDI and be transferred to the G/L 295 through the flexible circuit board attached to a lower side of the COG type of TDI, an external buffer, and the flexible circuit board.

In the methods of manufacturing the display devices having an embedded touch screen according to the third and fourth exemplary embodiments of the present invention described above, the touch sensors 10 are formed above the gate lines 240 or the source lines 250. Therefore, a process (S400) of reversing the first and second substrates 100 and 200 coupled to each other in the vertical direction as in the first and second exemplary embodiments may be omitted.

In the display device having an embedded touch screen according to an exemplary embodiment of the present invention, the TDI 30 is connected to the touch sensors 10 as illustrated in FIGS. 4 and 5 described above to detect a touch signal using a driving back phenomenon depending on whether or not a touch is generated by a touch input means, and a principle of detecting the touch signal will be described below.

FIG. 20 is a conceptual diagram of a three-terminal switching element used as an example of a capacitor charging means in an exemplary embodiment of the present invention among switching elements. Referring to FIG. 20, the three-terminal switching element generally includes three terminals such as an on/off control terminal Cont, an input terminal In, and an output terminal Out. The on/off control terminal Cont is a terminal controlling turn-on/turn-off of the switching element, and when a voltage or a current having a predetermined magnitude is applied to the on/off control terminal Cont, a voltage or a current applied to the input terminal In is output in a voltage or current form to the output terminal Out.

Before describing an example of a method of detecting a touch signal according to an exemplary embodiment of the present invention in detail, a principle in which a touch capacitance and a capacitance between lines are formed will be briefly described with reference to FIG. 21. In an example of FIG. 21, it is assumed that a touch sensor 10 and a finger 25 are spaced apart from each other by an interval of "d" and have an overlap area (or an overlap contact area) of "A" when the finger 25 or a conductive touch means (for example, a capacitive touch pen) similar to the finger 25 approaches the touch sensor 10. In this case, as represented by a right equivalent circuit and Equation: "C=(eA)/d" of FIG. 21, a capacitance "C" is formed between the finger 25 and the touch sensor 10. In the present disclosure, the capacitance formed between the finger 25 and the touch sensor 10 is called a touch capacitance Ct.

In addition, in the example of FIG. 21, when two sensor signal lines parallel with each other, instead of the finger 25 and the touch sensor 10, are spaced apart from each other by an interval of "d" and have an overlap area of "A", a capacitance C between lines as represented by an equivalent circuit and Equation: "C=(eA)/d" of FIG. 21 is also formed between the two sensor signal lines. When the signal lines are formed of ITO or a metal, a value obtained by multiplying a thickness of an applied ITO or metal by overlap lengths between the two signal lines becomes an overlap area between the two signal lines parallel with each other, and a level at which the two signal lines are spaced apart from each other becomes a spaced distance. In an exemplary embodiment of the present invention, since an optically clear adhesive (OCA) or an air layer is formed between the two signal lines, permittivity of the OCA or the air may be used as permittivity (e) in Equation: "C=(eA)/d" of FIG. 21.

FIG. 22 is a circuit diagram illustrating a basic structure of a touch detecting means in the display device having an embedded touch screen according to an exemplary embodiment of the present invention. Referring to FIG. 22, the touch detecting means according to an exemplary embodiment of the present invention has a basic structure including a charging means 12, touch sensors 10, sensor signal lines 22, a parasitic capacitance capacitor Cp, and a touch detecting unit 14.

The charging means 12 is a switching element such as a transistor (TR), a field effect transistor (FET), a metal oxide semiconductor FET (MOSFET), a complementary metal oxide semiconductor (CMOS), or the like, supplying Vpre, which is a pre-charging signal (or a charging signal), to all capacitors connected to the touch detecting unit 14 and turned off by a turn-off signal applied to an "on-off control terminal" called "Cont" to make an output terminal 12-1 a high impedance state or a linear element such as an operational amplifier (OPAMP) supplying a signal depending on a control signal.

The touch sensors 10 include sensing pads 10a that are connected to the touch detecting unit 14 and detect a touch signal and non-sensing pads 10b that are not connected to the touch detecting unit 14 and do not detect a touch signal.

The sensing pads 10a and the non-sensing pads 10b are not fixed, and the same touch sensors 10 may be changed by a time sharing technique (the sensing pads are changed into the non-sensing pads after a predetermined time interval. The sensing pads 10a are connected to the touch detecting unit 14 in order to detect a touch, and the non-sensing pads 10b are not connected to (or are spaced apart from) the touch detecting unit 14. Therefore, one touch sensor 10 is divided into the sensing pad or the non-sensing pad depending on whether or not to be connected to the touch detecting unit 14.

It is assumed in an example of FIG. 22 that the touch sensors 10 become the sensing pad one by one and the other touch sensors 10 are the non-sensing pads, and a touch sensor 10 denoted by "PC" is operated as the sensing pad 10a, and all of the other touch sensors are the non-sensing pads PA, PB, PD, PE, PF, PG, PH, PI, and PJ. The touch sensor denoted by "PB" serves as the sensing pad before the sensing pad 10a denoted by "PC" is operated, and the touch sensor denoted by "PD" is changed from the non-sensing pad into the sensing pad after the sensing pad denoted by "PC" is operated. As described above, the change of the touch sensor 10 into the sensing pad and the non-sensing pad is performed by a control of a timing controlling unit 33 of FIG. 4. FIG. 22 illustrates an example of a method of detecting a touch signal using one sensing pad 10a, and a plurality of touch sensors may be simultaneously operated as sensing pads.

In FIG. 22, when the pre-charging voltage Vpre is applied to a sensing pad signal line 22a and the sensing pad 10a denoted by PC, and non-sensing pads adjacent to the sensing pad 10a and denoted by PB, PD, and PF and non-sensing pad signal lines 22b-B, 22b-D, and 22b-F connected to the non-sensing pads are connected to any voltage Vlb1 having a predetermined potential difference from Vpre, capacitance is formed between the sensing pad 10a and the non-sensing pads 10b by the principle described with reference to FIG. 21.

In detail, since Vpre having a predetermined potential is applied to the sensing pad signal line 22a and the sensing pad 10a and the non-sensing pad signal line 22b-B connected to Vlb1 has a predetermined overlap distance and overlap area with respect to the sensing pad signal line 22a, a capacitance between lines corresponding to C1 is formed between the sensing pad signal line 22a and the non-sensing pad signal line 22b-B by the principle described with reference to FIG. 21, a capacitance between lines corresponding to C2 is formed between the sensing pad signal line 22a and the non-sensing pad signal line 22b-D by the same principle, and a capacitance between lines corresponding to C3 is formed between the sensing pad 10a and the non-sensing pad signal line 22b-F overlapping with the sensing pad 10a by the same principle.

In the related art, this capacitance between lines acts as a parasitic capacitor (Cp) to act as noise reducing touch sensitivity. However, in an exemplary embodiment of the present invention, since the capacitance between lines is used to detect the touch signal, Cp in Equation for calculating a voltage detected in the touch detecting unit is reduced to improve touch sensitivity, and the capacitance between lines, which is the reduced Cp, is disposed at a numerator position of Equation for calculating the voltage detected in the touch detecting unit to improve touch sensitivity, thereby doubly improving the touch sensitivity.

Meanwhile, a capacitance C4 between lines may also be formed when the non-sensing pad signal line 22b-B is present between the sensing pad signal line 22a and the non-sensing pad signal line 22b-A. In the present disclosure, capacitances between lines such as C1 to C3 formed between the sensing pad signal line 22a and the non-sensing pad signal lines are defined as primary capacitances between lines, and capacitances such as C4 formed in a state in which one non-sensing pad signal line is present or a plurality of non-sensing pad signal lines are present between the sensing pad signal line 22a and a non-sensing pad signal line are defined as secondary capacitances between lines.

Therefore, a plurality of secondary capacitances between lines may be formed in the sensing pad 10a and the sensing pad signal line 22a. Since the touch sensitivity is improve when the secondary capacitances between lines are used to detect the touch, it is preferable to connect all of the non-sensing pad signal lines for forming the secondary capacitances between lines to Vlb1 used to form the primary capacitances between lines. The non-sensing pad signal lines for forming the secondary capacitances between lines may be connected to a potential different from Vlb1, but it is preferable to commonly use Vlb1 in order to simplify a circuit.

In order to simplify the circuit or weaken the touch sensitivity in the case in which the touch sensitivity is excessively better than an expected value, it is possible to maintain the non-sensing pad signal lines (the non-sensing pad signal lines 22b-A and 22b-E in an example of FIG. 22) for forming the secondary capacitances between lines in a floating or high impedance state. Therefore, the secondary capacitances between lines are not generated between the floated non-sensing pad signal lines and sensing pad signal line. A touch drive IC (TDI) has a means generating the secondary capacitances between lines and determining whether to connect the non-sensing pad signal line 22b adjacent to the sensing pad signal line 22a to a predetermined potential or maintain the non-sensing pad signal line 22b adjacent to the sensing pad signal line 22a in the floating or high impedance state. The voltage Vlb1 connected to the non-sensing pad signal line 22b is a DC potential or an AV voltage including zero (0) V.

Since the primary capacitances C1 to C3 between lines and the secondary capacitances between lines are commonly connected to the sensing pad 10a, all of them may be represented by one equivalent capacitor. When one equivalent capacitor is an equivalent capacitor Ceq between lines, the circuit of FIG. 22 may be represented by an equivalent circuit as illustrated in FIG. 23.

Meanwhile, the equivalent capacitor Ceq between lines has the following features.

1. As an overlap length between the sensor signal lines 22a and 22b overlapping with each other becomes long, an overlap area becomes wide, such that an equivalent capacitance Ceq between lines becomes large. Therefore, as the sensing pads 10a become distant from the TDI, equivalent capacitances Ceq between lines become large.

2. It is possible to adjust a magnitude of the equivalent capacitance Ceq between lines depending on an overlap distance between the sensor signal lines 22a and 22b overlapping with each other. Since the overlap distance is a width between the sensor signal lines 22a and 22b overlapping with each other, it is possible to change the magnitude of the equivalent capacitance Ceq between lines by a design.

Referring to FIG. 23, the equivalent capacitor Ceq between lines is formed between the sensing pad 10a and the non-sensing pad 10b adjacent to the sensing pad 10a, and the non-sensing pad 10b is connected to any voltage Vlb1.

A plurality of non-sensing pads and non-sensing pad signal lines forming the primary capacitances between lines and the secondary capacitances between lines in FIG. 22 are represented by one equivalent non-sensing pad 10b and one equivalent non-sensing pad signal line 22b. Since the predetermined voltage Vlb1 is connected to all of the non-sensing pad signal lines 22b except for the sensing pad 10a in FIG. 22, the voltage Vlb1 is also connected to the non-sensing pad signal line 22b in FIG. 23. Therefore, although FIG. 23 illustrates as if the voltage Vlb1 is connected to one non-sensing pad signal line 22b, Vlb1 is actually connected to the plurality of non-sensing pad signal lines generating the primary or second capacitances between lines. Vlb1, which is a voltage applied to one side of the non-sensing pad signal line 22b when the pre-charging voltage Vpre is applied to the sensing pad, is a voltage for forming the equivalent capacitance Ceq between lines by pre-charging. An alternating voltage is applied to the non-sensing pad signal line 22b in order to detect the touch signal, and Vlb1 includes a low voltage or a high voltage of the alternating voltage.

An output terminal 12-1 of the charging means 12 and all the capacitors connected to the output terminal 12-1 are connected to the touch detecting unit 14. A buffer 14-1 is one of components constituting the touch detecting unit 14, and an input terminal of the buffer has high impedance (hereinafter, referred to as Hi-z) characteristics. When the output terminal 12-1 of the charging means 12 is connected to a Hi-z input terminal of the touch detecting unit in a Hi-z state, all the capacitor Ceq, Ct, Cvcom, and Cp connected between the output terminal 12-1 of the charging means 12 and the buffer 14-1 become a Hi-z state.

As described below, a magnitude of Ceq is changed depending on a length of the sensing pad signal line 22a connecting the sensing pad 10a, and thus, a charging time is also changed depending on a position of the sensing pad. Since the charging time cannot but be determined to be the longest charging time when the charging time is determined to be one fixed time, a touch detection time becomes slow. Therefore, the TDI has a means that may determine the charging time. The charging time is determined to be a turn-on time of the charging means 12.

Although a case in which the output terminal 12-1 of the charging means 12 is directly connected to the buffer 14-1 has been illustrated by way of example in FIG. 23, all the elements of which inputs are in a Hi-z state, such as a gate of a MOS, a gate of a TFT, or the like may be used instead of the buffer 14-1. The reason why the output terminal 12-1 of the charging means 12 and the touch detecting unit 14 become the Hi-z state is that a discharging route of isolated electric charges is not present in the Hi-z state, such that it is easy to detect a magnitude of a variation in a voltage formed at a point P of FIG. 23.

An output signal of the buffer 14-1 is input to an amplifier 14-2. In the case in which a change amount in the voltage detected at the point P of FIG. 23 depending on whether or not the touch is generated is small, it is preferable to amplify the signal using the amplifier 14-2. An output signal of the amplifier 14-2 is input to a DAC 14-3 and the DAC 14-3 performs converting operation using a ref voltage 14-4.

In addition, the signal detected and amplified in the touch detecting unit 14 may pass through an ADC 14-5 in order to be transferred to a signal processing unit 35 of FIG. 4 to be described below. One ADC 14-5 or a plurality of ADCs 14-5 may be used, and when the plurality of ADCs 14-5 are used, the signal may be more rapidly processed.

Structures of the touch sensors in the display device having an embedded touch screen according to an exemplary embodiment of the present invention are the same as those of the touch sensors described above, and the sensor signal lines 22 connecting the touch sensors are signal lines connecting polarity of touch capacitances formed when a touch means such as the finger 25 approaches the touch sensors 10 to the touch detecting unit 14, and may be formed using the same mask as the mask used to form the touch sensors 10. Referring to FIG. 23, a magnitude of a resistance of the sensor signal line 22 is denoted by Rt, and a magnitude of a resistance of the non-sensing pad 10b is denoted by Rnt.

Since these resistance components act as factors generating a delay of the touch signal at the time of detecting the touch signal, it is preferable that they are small. Therefore, it is preferable that the number of connections of the sensor signal lines 22 connected to the touch sensors 10 disposed at a distance distant from the TDI is increased in order to reduce a resistance.

Again referring to FIG. 23, when the finger 25 of a human body approaches the touch sensor 10 at a predetermined interval, a touch capacitance Ct is formed between the finger 25 and the touch sensor 10. Ct, which is a value set by Equation: C=(eA)/d of FIG. 21, may be adjusted by adjusting an interval, an overlap area, or the like, between the touch means such as the finger 25 and the touch sensor 10. For example, when an area of the touch sensor 10 is increased, Ct is also increased depending on Equation of FIG. 21. To the contrary, when an area of the touch sensor 10 is reduced, Ct is also reduced. As an example, Ct may be designed to be several femto F to several tens of micro F.

Again referring to FIG. 23, the pre-charging voltage Vpre is applied to an input terminal 12-2 of the charging means 12, and is output through the output terminal 12-1 when the switching element, which is the charging means 12, is turned on by a control voltage Vg applied to the on/off control terminal Cont. Therefore, all the capacitors connected to the output terminal 12-1 of the charging means 12 are charged with the pre-charging voltage Vpre.

Therefore, when the charging means 12 is turned off by dropping the control voltage Vg of the charging means 12 from a high level to a low level after the point P of FIG. 23 is charged, the point P, which is the touch detecting unit, becomes Hi-Z, such that electric charges at the point P are isolated in the touch capacitor Ct, the equivalent capacitor Ceq between lines, and the parasitic capacitor Cp. An example, when an alternating voltage is applied to the equivalent capacitor Ceq between lines, a magnitude of the voltage detected at the point P is in proportion to a magnitude of the alternating voltage applied to the equivalent capacitor Ceq between lines, and has a correlation with capacitances connected to the point P.

FIG. 24 is a view illustrating an example in which a touch sensor according to an exemplary embodiment of the present invention applies an alternating voltage to an equivalent capacitor Ceq between lines in order to detect a touch signal.

Referring to FIG. 24, the touch capacitance Ct formed between the touch sensor 10 and the conductor such as the finger 25, and Ceq, Cvom, and Cp are connected to the output terminal 12-1 of the charging means 12. Therefore, when the pre-charging signal Vpre is applied to the input terminal 12-2 of the charging means 12 in a state in which the charging means 12 is turned on, Ceq, Ct, and Cp are charged with a pre-charging level Vpre, such that a potential of an input terminal of the touch detecting unit 14 becomes the pre-charging level Vpre. Then, when the charging means 12 is turned off, signals charged in the three capacitors are maintained in the pre-charging signal level Vpre unless they are separately discharged.

In order to stably isolate the charged signals, the output terminal 12-1 of the charging means 12 and the input terminal of the touch detecting unit 14 are in a Hi-z state.

The touch detecting unit 14 detects a voltage of the sensing pad 10a (or a voltage of the point P). The touch detecting unit 14 detects a voltage of the point P when the touch is not generated (that is, when Ct is not formed), and detect a voltage of the point P when the touch is generated (that is, when Ct is formed), and obtains the touch signal using a magnitude difference between the detected two voltages. Although a sensing signal line resistor Rt is present between the sensing pad 10a and the input terminal of the touch detecting unit, which is the point P, in an example of FIG. 24, since magnitudes of the signal across Rt after a predetermined point in time are the same as each other, an influence of Rt is ignored. Therefore, in the present disclosure, the voltage detected in the sensing pad 10a and the voltage detected at the point P have the same meaning.

In an exemplary embodiment of the present invention, when the point P of FIG. 24 is charged with the charging voltage Vpre, a predetermined voltage Vl or Vh is connected to one side of the non-sensing pad signal line 22b connected to the non-sensing pad 10b. Vl is a low voltage of an alternating voltage according to an exemplary embodiment of the present invention, Vh is a high voltage of the alternating voltage according to an exemplary embodiment of the present invention, and Vh and Vl are swung in the alternating voltage. Vh or Vl serves as Vlb1 described above, that is, serve to form an equivalent capacitor Ceq between lines.

The alternating voltage is applied to the non-sensing pad signal line 22b in order to detect a touch signal when a predetermined time elapses after the charging voltage Vpre is applied. An absolute magnitude of the alternating voltage is Vh-Vl, and a potential may be changed from a high voltage Vh to a low voltage Vl or from the low voltage Vl to the high voltage Vh. The alternating voltage has various shapes such as a square wave shape, a triangular wave shape, a sine wave shape, a sawtooth wave shape, or the like, and the TDI according to an exemplary embodiment of the present invention may vary a magnitude or a frequency of the alternating voltage.

The touch detecting unit 14 detects the voltage in synchronization with a rising edge or a rising time in which the alternating voltage rises from the low voltage Vl to the high voltage Vh or a falling edge or a falling time in which the alternating voltage falls from the high voltage Vh to the low voltage Vl. It is preferable that the TDI detects the voltage after a predetermined time is delayed from the rising or falling edge when detecting the voltage in synchronization with the rising or the falling edge. The reason is that some time (for example, several tens of nano seconds or several tens of micro seconds) is required until the detected voltage is stabilized by a resistance component Rt of the sensing pad signal line 22a and a resistance component Rnt of the non-sensing pad.

In addition, since an electromagnetic wave generated in the rising edge or the falling edge of the alternating voltage may have an influence on an apparatus coupled to a capacitive touch detecting means according to an exemplary embodiment of the present invention, the TDI according to an exemplary embodiment of the present invention may further include a means adjusting a gradient of the alternating voltage in the rising edge or the falling edge. A register may be used as an example of the means adjusting the gradient in the TDI. A time in the rising edge or the falling edge is mapped to a plurality of registers, and when one of the plurality of registers is selected, an alternating voltage generating unit 42 of FIG. 4 adjusts the gradient of the alternating voltage in the rising edge or the falling edge.

When the point P of FIG. 24 is charged with the charging voltage Vpre, if it is assumed that a voltage applied to the no-sensing pad signal line 22b is Vh or Vl, the equivalent capacitor Ceq between lines is charged with a voltage corresponding to a difference between Vpre and Vh or a difference between Vpre and Vl. For example, when Ceq is charged with Vpre, if an initial voltage connected to the non-sensing pad signal line 22b is the high voltage Vh, the alternating voltage is swung from the high voltage Vh to the low voltage Vl, and a polarity of the alternating voltage is negative (−). In addition, when Ceq is charged with Vpre, if an initial voltage connected to the non-sensing pad signal line 22b is the low voltage Vl, the alternating voltage is swung from the low voltage Vl to the high voltage Vh, and a polarity of the alternating voltage is positive (+).

In the following Equation 1 and Equation 2, a capacitance, which is a magnitude of Ct, is changed depending on whether or not the touch is generated or depending on an overlap distance or an overlap area between the touch means and the touch sensing pad 10a, and a value of Ct in the following Equation 1 and Equation 2 when the touch is not detected is not present. In an exemplary embodiment of the present invention, a difference between the detected voltage when the touch is not generated, that is, when Ct is not generated, and a voltage value when the touch is generated, that is, CT is generated, is detected to detect whether or not the touch is generated or a touch area. Therefore, it is preferable to store a voltage value in a non-touch state, which is a fixed value, in a storage device (a memory 28 of FIG. 4).

When a voltage detected by the touch detecting unit 14 when all the touch sensors 10 are not touched is stored in the memory and a difference between this voltage and a voltage detected by the touch detecting unit when the corresponding touch sensor 10 is operated as the sensing pad is detected, it is possible to easily detect whether or not the touch is generated and the touch area.

Meanwhile, Vh and Vl are generated in a power supply unit 47 (of FIG. 4) in the TDI, and alternates of Vh and Vl are generated in the alternating voltage generating unit 42 (of FIG. 4) in the TDI.

Signal detected when Ceq is not used and alternating voltage is applied to G/L $$D/B = Vpre \pm Vdrv \frac{Cdrv + Cgl}{Cdrv + Cgl + Cp + Ct} \quad \text{[Equation 1]}$$

Signal detected when Ceq is used and alternating voltage is applied to G/L $$D/B = Vpre \pm Vdrv \frac{Ceq + Cgl}{Ceq + Cgl + Cp + Ct} \quad \text{[Equation 2]}$$

Sensed voltage detected in synchronization with AC input power $$D/B = Vpre \pm Vc2 \frac{Ct}{Cgs + Cp + Ct} \quad \text{[Equation 3]}$$

Ct of Equation 1 or Equation 2 may be obtained from the following Equation 4.

$$Ct = \epsilon 2 \frac{S2}{D2} \quad \text{[Equation 4]}$$

In Equation 4, $\epsilon_2$ may be obtained from a medium between the touch sensor 10 and the finger 25, and may be calculated by a complex permittivity of a plurality of media when the plurality of media are used. $S_2$ corresponds to an overlap area between the sensing pad 10*a* and the finger 25. When the finger 25 covers the entirety of any sensing pad 10*a*, $S_2$ corresponds to an area of the touch sensor 10. When the finger 25 covers a portion of the touch sensor 10, $S_2$ will correspond to an area reduced from an area of the sensing pad 10*a* by an area that does not overlap with the finger 25. In addition, $D_2$ is a distance between the sensing pad 10*a* and the finger 25, and will thus correspond to a thickness of the protection layer 24 put on an upper surface of a touch screen panel 50.

Again referring to FIG. 4, FIG. 4 is a configuration diagram illustrating an example of a touch screen panel according to an exemplary embodiment of the present invention and illustrates an example in which touch sensors 10 are arranged in a dot matrix form.

At a lower end of FIG. 4, a configuration of a TDI 30 is illustrated. The TDI 30 may include a driving unit 31, a touch detecting unit 14, a timing controlling unit 33, a signal processing unit 35, a memory unit 28, an alternating voltage generating unit 42, a power supply unit 47, and a communicating unit 46, and may further include a CPU 40. The CPU 40 is a microprocessor having a calculation function, and may also be positioned outside the TDI 30.

The driving unit 31 includes the charging means 12, and includes a function of selecting the sensing pad and the non-sensing pads among a plurality of touch sensors 10 and connecting the selected sensing pad and non-sensing pads to the touch detecting unit 14. In addition, the driving unit 31 includes a function of connecting one side of the non-sensing pad signal line 22*b* to Vh or Vl during a charging operation using the charging means 12.

The timing controlling unit 33 serves to generate a plurality of different clocks required in the TDI 30. For example, clocks are required in order to operate the CPU 40, and are also required in order to operate the ADC or sequentially operate multiplexers of the driving unit 31. Several kinds of clocks are required for each function as described above, and the timing controlling unit 33 may generate and supply the plurality of various clocks as described above.

The signal processing unit 35 transfers an ADC value generated in the touch detecting unit 14 to the CPU 40, controls the communicating unit 46 to transmit the ADC value to the outside of the TDI 30 through inter-integrated circuit (I2C) or serial peripheral interface bus (SPI) signal lines, or generates and supplies signals required in all functional elements in the TDI 30, such as the touch detecting unit 14, the driving unit, or the like. Functional elements or functional blocks indicate components performing the respective functions illustrated in FIG. 4. For example, currently, nine functional blocks are included in the TDI, and the CPU 40 is one of the nine functional blocks. The signal processing unit 35 stores the ADC value generated in the touch detecting unit 14 in the memory unit 28, and/or performs a required calculation. For example, the signal processing unit 35 may calculate a touch area due to the touch between the touch sensor 10 and the touch means with reference to the ADC value generated in the touch detecting unit 14, and may also calculate a touch coordinate using the ADC value or the calculated touch area value.

The memory unit 28 may be formed of a flash memory, an electrically erasable programmable read only memory (EEPROM), a static random access memory (SRAM), or a dynamic RAM (DRAM). Several register values required for driving the TDI 30 or programs required for operating the CPU 40 are stored in the flash memory or the EEPROM.

Many functions of the CPU 40 may overlap with functions performed by the signal processing unit 35. Therefore, the CPU 40 may not be included in the TDI 30 or may be positioned outside the TDI 30. Any one of the CPU 40 and the signal processing unit 35 may not be temporarily used in a section in which it is expected that the CPU 40 and the signal processing unit 35 will redundantly perform their functions.

The CPU 40 may perform most of the functions performed by the signal processing unit 35, and extracts a touch coordinate, performs a gesture such as zoom, rotation, movement, or the like, or performs several functions. In addition, the CPU 40 may calculate an area of a touch input to generate a zooming signal, calculate strength of the touch input, and process data in various forms in which only a graphic user interface (GUI) object desired by a user (for example, a GUI object of which a large area is detected) in the case in which GUI objects such as a keypad are simultaneously touched is recognized as an effective input and use the processed data in the TDI 30 or transmit the processed data to the outside through communication lines.

A program for controlling the CPU 40 may be installed in the memory unit 28 and be replaced by a new program when corrections are generated. The new program may be executed using communication bus included in the communicating unit 46, for example, serial communication such as an I2C, an SPI, a universal serial bus (USB), or the like, or parallel communication such as a CPU interface (hereinafter, referred to as I/F), or the like.

The communicating unit 46 performs a function of outputting required information to the outside of the TDI 30 or inputting information provided from the outside of the TDI 30 to the inside of the TDI. In the communicating unit, the serial communication such as the I2C, the SPI, or the like, or the parallel communication such as the CPU I/F, or the like, is used.

The alternating voltage generating unit 42 generates the alternating voltage applied to the equivalent capacitor Ceq between lines. The high voltage Vh and the low voltage Vl of the alternating voltage are generated by the power supply unit 47, and the alternating voltage generating unit 42 combines the high voltage Vh and the low voltage Vl with each other to generate the alternating voltage, thereby allowing the driving unit 31 to use the alternating voltage. In addition, the alternating voltage generating unit 42 has a means adjusting the gradient of the alternating voltage in the rising edge or the falling edge.

In an example as illustrated in FIG. 4, the number of sensing pads detecting the touch signal is one or plural, and it is preferable that the number of sensing pads is plural in terms of reducing a sensing time. The sensing pads may be randomly selected among thirty touch sensors 10 disposed in six rows Row1 to Row6 and five columns Col1 to Col5, and may be selected column-by-column or be selected row-by-row. In an exemplary embodiment of the present invention, coordinates of rows and columns are set on the basis of a position of the TDI. Therefore, the coordinates of the rows and the columns of the touch sensors are not fixed, but may be relatively changed depending on a setting position of the TDI.

In an example in which the sensing pads are selected column-by-column, when six touch sensors 10 included in Col1 are determined to be simultaneously initial sensing pads, all of the six touch sensors 10 included in Col1 are operated as the sensing pads. (In this case, touch sensors included in Col2 and Col6) are operated as the non-sensing pads.) However, in this case, the equivalent capacitor Ceq between lines described above is not formed or has a small capacitance even though it is formed, such that touch detection sensitivity becomes small. Therefore, it is preferable that the touch is sensed row-by-row as compared with column-by-column. The reason is that when the touch is sensed row-by-row, adjacent sensing pad signal lines 22 are not present, such that a malfunction due to interference of signals is not generated.

All of the touch sensors 10 included in Row2 to Row6 are operated as the non-sensing pads during a period in which five touch sensors 10 included in Row1 are selected and operated as the sensing pads. When the five touch sensors 10 included in Row1 complete functions of the sensing pads, a process in which five touch sensors 10 included in Row2 become the sensing pads and touch sensors 10 included in Row1 and Row3 to Row6 are operated as the non-sensing pads is sequentially repeated. Since the five touch sensors 10 included in Row1 are operated as the sensing pads, it is preferable that five driving units 31 are present in the TDI. Therefore, the five sensing pads are simultaneously driven, thereby making it possible to reduce a touch detection time.

Meanwhile, referring to the first feature of two features of the sensing equivalent capacitor Ceq between lines described above, a sensing equivalent capacitance Ceq when the five touch sensors 10 included in Row1 are operated as the sensing pads is larger than a sensing equivalent capacitance Ceq when the five touch sensors 10 included in Row6 are operated as the sensing pads. The reason is that a length of the sensor signal lines 22 connected to the touch sensors 10 positioned in Row1 is longer than that of the sensor signal lines 22 connected to the touch sensors 10 positioned in Row6. Since magnitudes of the sensing equivalent capacitances Ceq formed in the sensing pads become large as the sensing pads become distant from the TDI, it is preferable to compensate for different magnitudes of the sensing equivalent capacitances Ceq in order to detect a uniform touch signal. The meaning of the compensation for the magnitudes of the sensing equivalent capacitances Ceq is to allow the same voltage to be detected even though positions of the sensing pads are different from each other with respect to the same touch capacitance Ct by adding a compensation capacitor to the sensing equivalent capacitance Ceq of Equation 1 or Equation 2.

The display device having an embedded touch screen according to an exemplary embodiment of the present invention has a means compensating for the different magnitudes of the sensing equivalent capacitances Ceq so that the same touch sensitivity is maintained in each position on the basis of the magnitudes of the sensing equivalent capacitances Ceq different from each other in each position.

In the display device having an embedded touch screen according to an exemplary embodiment of the present invention, the touch sensor and the sensor signal line are formed to be positioned on the same line as the driving signal line such as the source line, the gate line, or the like, of the display device, to prevent the touch sensor and the sensor signal line from being observed in the display device and remove an influence of the touch sensor and the sensor signal line on the display device.

In addition, a recognition error of the touch signal due to disconnection of the sensor signal line may be prevented, such that touch recognition performance of the display device may be stably maintained.

Further, the guard layer (G/L) is installed to reduce the parasitic capacitance generated between the touch sensor and the sensor signal line and components of the display device, thereby easily obtaining the touch signal.

Further, the sensor signal line is used together with the source metal or the gate metal used in the display device in an area except for the active area (A/A) of the display device to reduce a resistance of the sensor signal line, thereby easily detecting the obtained touch signal.

It will be obvious to those skilled in the art to which the present invention pertains that the present invention is not limited to the above-mentioned exemplary embodiments and the accompanying drawings, but may be variously substituted, modified, and altered without departing from the scope and spirit of the present invention.

What is claimed is:

1. A display device having an embedded touch screen, the display device comprising:
    a first substrate and a second substrate disposed to overlap with each other;
    wherein a pixel electrode and a driving signal line are disposed on the second substrate,
    a sensor layer including a touch sensor sensing a touch signal and a sensor signal line, the sensor layer being disposed above or below the driving signal line; and
    a guard layer (G/L) reducing a parasitic capacitance generated between the driving signal line, and the touch sensor and the sensor signal line, the guard layer being disposed between the driving signal line and the sensor layer;

a first insulator disposed between the guard layer and the touch sensor; and a second insulator disposed above the guard layer, wherein a voltage is applied to the guard layer, and the voltage applied to the guard layer is an alternating voltage or is the same as a voltage applied to the touch sensor.

2. The display device having an embedded touch screen of claim 1, wherein a color filter is formed on the first substrate or the color filter and a common electrode are formed on the first substrate.

3. The display device having an embedded touch screen of claim 1, wherein the first insulator is applied over an entire active area (A/A) of the display device.

4. The display device having an embedded touch screen of claim 1, wherein the second insulator is applied over an entire active area (A/A) of the display device.

5. The display device having an embedded touch screen of claim 1, wherein the first insulator and the second insulator are formed of the same material or different materials.

6. The display device having an embedded touch screen of claim 1, wherein the first insulator and the second insulator are etched using the same mask.

7. The display device having an embedded touch screen of claim 1, wherein the guard layer is divided into a plurality of areas, and the respective divided areas coincide with block driving areas of the touch sensors and are selectively driven.

8. A method of manufacturing a display device having an embedded touch screen, the display device including a first substrate and a second substrate disposed to overlap with each other, the method comprising:

forming a sensor layer on a thin film transistor (TFT) substrate;

forming a driving signal line and a pixel electrode of the second substrate above or below the sensor layers;

after the forming of the sensor layer, forming a guard layer (G/L) between the driving signal line and the sensor layer; and before the forming of the guard layer, forming a first insulator above the sensor layer; and after the forming of the guard layer, forming a second insulator above the guard layer, wherein the forming of the sensor layer includes forming an isolated touch sensor and a sensor signal line connecting the touch sensor and a touch drive integrated circuit (TDI) to each other on the sensor layer, wherein reduces a parasitic capacitance generated between the driving signal line, and the touch sensor and the sensor signal line, and wherein a voltage is applied to the guard layer, and the voltage applied to the guard layer is an alternating voltage or is the same as a voltage applied to the touch sensor.

9. The method of manufacturing a display device having an embedded touch screen of claim 8, wherein a color filter is formed on the first substrate or the color filter and a common electrode are formed on the first substrate.

10. The method of manufacturing a display device having an embedded touch screen of claim 8, wherein any one or more of the first insulator and the second insulator are applied over an entire active area (A/A) of the display device.

11. The method of manufacturing a display device having an embedded touch screen of claim 8, wherein the first insulator and the second insulator are formed of the same material or different materials.

12. The method of manufacturing a display device having an embedded touch screen of claim 8, wherein the first insulator and the second insulator are etched using the same mask.

13. The method of manufacturing a display device having an embedded touch screen of claim 8, wherein the guard layer is divided into a plurality of areas, and the respective divided areas coincide with block driving areas of the touch sensors and are selectively driven.

14. The method of manufacturing a display device having an embedded touch screen of claim 8, further comprising forming the first substrate separately from the forming of the sensor layer and the forming of the driving signal line and the pixel electrode, wherein the forming of the first substrate includes:

forming a pattern of a black matrix on a glass substrate;

forming patterns of red (R), green (G), and blue (B) color filters in an area in which the pattern of the black matrix is not formed; and forming a common electrode above the patterns of the red (R), green (G), and blue (B) color filters.

* * * * *